United States Patent
Tamura et al.

(10) Patent No.: US 10,270,321 B2
(45) Date of Patent: Apr. 23, 2019

(54) ELECTRIC MOTOR

(71) Applicant: Mitsuba Corporation, Kiryu-shi, Gunma (JP)

(72) Inventors: Natsumi Tamura, Kiryu (JP); Tomoo Iijima, Kiryu (JP); Teppei Tokizaki, Kiryu (JP); Satoshi Tamura, Kiryu (JP)

(73) Assignee: Mitsuba Corporation, Gunma (JP)

( * ) Notice: Subject to any disclaimer, the term of this patent is extended or adjusted under 35 U.S.C. 154(b) by 210 days.

(21) Appl. No.: 15/128,491

(22) PCT Filed: May 13, 2015

(86) PCT No.: PCT/JP2015/063751
§ 371 (c)(1),
(2) Date: Sep. 23, 2016

(87) PCT Pub. No.: WO2015/174449
PCT Pub. Date: Nov. 19, 2015

(65) Prior Publication Data
US 2017/0104395 A1 Apr. 13, 2017

(30) Foreign Application Priority Data

May 13, 2014 (JP) ................................ 2014-099400
May 8, 2015 (JP) ................................ 2015-095609
May 8, 2015 (JP) ................................ 2015-095921

(51) Int. Cl.
*H02K 13/10* (2006.01)
*H02K 5/14* (2006.01)
(Continued)

(52) U.S. Cl.
CPC ................ *H02K 13/10* (2013.01); *B60S 1/08* (2013.01); *B60S 1/166* (2013.01); *H02K 5/145* (2013.01);
(Continued)

(58) Field of Classification Search
CPC ..................................................... H02K 13/10
(Continued)

(56) References Cited

U.S. PATENT DOCUMENTS 4,673,837 A * 6/1987 Gingerich .............. H02K 5/148
29/597
5,221,130 A * 6/1993 Satoh ...................... H01F 27/29
310/239

(Continued)

FOREIGN PATENT DOCUMENTS

JP 60-117660 8/1985
JP 06085448 A 3/1994
(Continued)

OTHER PUBLICATIONS

Japanese Patent Office, Search Report in International Patent Application No. PCT/JP2015/063751 dated Aug. 4, 2015.
(Continued)

*Primary Examiner* — Robert W Horn
(74) *Attorney, Agent, or Firm* — Wood Herron & Evans LLP

(57) ABSTRACT

An electric motor includes: brushes (31) that are brought into sliding contact with a commutator of an armature that is fixed to a rotation shaft and feeds electric power; a brush holder stay (33) that supports the brushes (31) via brush holders (41); noise prevention elements (110) that are electrically connected to the brushes (31); and terminals (130) and jump wires (141) that electrically connect between the brush holders (41) and the noise prevention elements (110), wherein first connection portions, which connect between the noise prevention elements (110) and the terminals (130), and second connection portions, which connect between the terminals (130) and the jump wires (141), are both disposed only on a first surface (S1) of the brush holder stay (33).

8 Claims, 16 Drawing Sheets

(51) Int. Cl.
*H02K 5/22* (2006.01)
*H02K 7/116* (2006.01)
*H02K 11/026* (2016.01)
*H02K 11/38* (2016.01)
*H02K 13/00* (2006.01)
*B60S 1/08* (2006.01)
*B60S 1/16* (2006.01)

(52) U.S. Cl.
CPC ............ *H02K 5/148* (2013.01); *H02K 5/225* (2013.01); *H02K 7/1166* (2013.01); *H02K 11/026* (2013.01); *H02K 11/38* (2016.01); *H02K 13/006* (2013.01)

(58) Field of Classification Search
USPC .......................................................... 310/51
See application file for complete search history.

(56) References Cited

U.S. PATENT DOCUMENTS

| | | | | |
|---|---|---|---|---|
| 5,382,852 A | * | 1/1995 | Yuhi | H02K 5/145 |
| | | | | 310/40 MM |
| 5,598,045 A | * | 1/1997 | Ohtake | H02K 5/225 |
| | | | | 310/40 MM |
| 5,939,812 A | * | 8/1999 | Wetzel | B60T 8/4022 |
| | | | | 310/239 |
| 6,300,696 B1 | * | 10/2001 | Wong | H02K 5/145 |
| | | | | 310/239 |
| 7,855,479 B2 | * | 12/2010 | Kawarai | H02K 11/026 |
| | | | | 310/239 |
| 2017/0104395 A1 | * | 4/2017 | Tamura | H02K 11/026 |

FOREIGN PATENT DOCUMENTS

| | | |
|---|---|---|
| JP | 2000-060076 A | 2/2000 |
| JP | 2003126979 A | 5/2003 |
| JP | 2004-229419 A | 8/2004 |
| JP | 2005-318689 A | 11/2005 |
| JP | 2011-234438 A | 11/2011 |
| JP | 2012-138994 A | 7/2012 |
| JP | 2012-147570 A | 8/2012 |

OTHER PUBLICATIONS

European Patent Office, Search Report issued in European Patent Application No. 15792313.7 dated Nov. 23, 2017, 9 pages.

Japanese Patent Office, Office Action issued in JP 2015-095609 dated Sep. 4, 2018, 4 pages.

\* cited by examiner

ELECTRIC MOTOR

TECHNICAL FIELD

The present invention relates to an electric motor.

The present application claims priority based on Japanese Patent Application No. 2014-099400 filed on May 13, 2014, on Japanese Patent Application No. 2015-095921 filed on May 8, 2015, and on Japanese Patent Application No. 2015-095609 filed on May 8, 2015, the contents of which are incorporated herein by reference.

BACKGROUND ART

Conventionally, there are cases where, as a wiper motor for an automobile, a 3-brush-type electric motor is used that is capable of switching speeds of rotation. An electric motor of this type is one in which a plurality of magnets are arranged so as to be spaced in the circumferential direction on an inner circumferential surface of a bottomed-cylinder-like yoke and in which an armature is rotatably arranged on an inner side of these magnets.

The armature includes: an armature core that is fitted onto and fixed to a rotation shaft; an armature coils that are wound around the armature core; and a commutator that is fitted onto and fixed to the rotation shaft so as to be adjacent to the armature core.

A commutator is one in which a plurality of segments are disposed in the circumferential direction in a state of being insulated from each other and in which an end portion of each armature coil is connected to each segment.

Furthermore, with the segments, a plurality of brushes, which are spaced in the circumferential direction, are in sliding contact. Via these brushes, electric power is fed to the armature coils.

The brushes include a low speed brush, a high speed brush, and a common brush that is used as these brushes, and each brush is held in a brush holder stay via each brush holder. Furthermore, the low speed brush and the common brush are arranged at positions 180 degrees away from each other in electrical angle (mechanical angle×the number of pole pairs), and at the same time, the high speed brush is arranged so as to be a predetermined angle spaced from the low speed brush in the circumferential direction. With selective switching of electric current application between the low speed brush and the high speed brush, the speed of the electric motor is made switchable.

In a holder unit, wiring members such as terminals and jump wires are used in order to secure electric current application to each brush. For electrical connection of these wiring members, caulking or resistance welding is used.

RELATED ART DOCUMENT

Patent Document

Patent Document 1: Japanese Unexamined Patent Application, First Publication No. 2004-229419

SUMMARY

Problems to be Solved by the Invention

In conventional electric motors, electrical connection points of the wiring members on the brush holder stay are present at plural locations on both of its front and rear surfaces. Therefore, assemblability of the wiring members is bad, and many assembly steps are required. This leads to a problem of an increase in cost of the electric motor. Furthermore, because assembly steps are widely different according to the level of skill of the workers, there is a problem in assembly management.

The present invention has an object to provide an electric motor that is capable of improving the assemblability of the wiring members on a brush holder stay.

Means for Solving the Problem

According to a first aspect of the present invention, an electric motor includes: brushes that are brought into sliding contact with a commutator of an armature that is fixed to a rotation shaft and feeds electric power; a brush holder stay that supports the brushes via brush holders; noise prevention elements that are electrically connected to the brushes; and a plurality of terminals and a plurality of jump wires that electrically connect between the brushes and the noise prevention elements, wherein a plurality of first connection portions, which connect between the noise prevention elements and the terminals, and a plurality of second connection portions, which connect between the terminals and the jump wires, are both disposed only on a first surface of the brush holder stay.

With the structure as described above, connection portions (first connections) between the noise prevention elements and the terminals, and connection portions (second connection portions) between the terminals and the jump wires are disposed only on the first surface of the brush holder stay. Therefore, in the connection work of the noise prevention elements, the terminals, and the jump wires, it is possible to assemble these without reversing the brush holder stay. Accordingly, the assemblability of the noise prevention elements, the terminals, and the jump wires is improved.

Furthermore, in a second aspect of the present invention, in the electric motor according to the first aspect of the present invention, the plurality of first connection portions are formed by laser-welding the noise prevention elements and the terminals, and the plurality of second connection portions are formed by laser-welding the terminals and the jump wires.

With the structure as described above, by irradiating the laser beam only from the direction in which the first surface of the brush holder stay faces, the noise prevention elements and the terminals, and the terminals and the jump wires are respectively connected.

Furthermore, in a third aspect of the present invention, in the electric motor according to the second aspect of the present invention, the first connection portion and the second connection portion are arranged at a distance of 4 mm or less in a thickness direction of the brush holder stay.

With the structure as described above, it is possible to reduce an error in the distances (focal points) from the laser irradiation port of the laser welding machine to the connection portions (first connection portion, second connection portion) to 4 mm or less. Therefore, it is possible to form the first connection portion and the second connection portion only by the laser welding machine causing the beam to scan along the surface direction of the brush holder stay without causing the beam to scan in the direction orthogonal to the surface direction of the brush holder stay. Accordingly, it is possible to further improve the assemblability of the noise prevention elements, the terminals, and the jump wires.

Furthermore, in a fourth aspect of the present invention, in the electric motor according to any one of the first aspect to the third aspect of the present invention, the terminal has: a flat seat portion that is to be brought into close contact with the brush holder stay; a protrusion portion that protrudes from the seat portion in a direction in which the first surface faces and that is also formed into the first connection portion after a lead wire of the noise prevention element being inserted therethrough; and a hold clasp portion that protrudes from the seat portion in a direction in which the first surface faces and that is also formed into the second connection portion after holding the jump wire.

With the structure as described above, the seat portion is brought into close contact with the brush holder stay, and hence, the top portion of the protrusion portion functions as the first connection portion, and the top portion of the hold clasp portion functions as the second connection portion. Therefore, it is possible to maintain the first connection portions and the second connection portions constant in position in the thickness direction of the brush holder stay.

Furthermore, in a fifth aspect of the present invention, in the electric motor according to the fourth aspect of the present invention, a dimension between a top portion of the protrusion portion and a root portion of the hold clasp portion is set to 1.5 mm or less.

With the structure as described above, it is possible to make positional errors of the first connection portion and the second connection portion in the thickness direction of the brush holder stay as small as possible. Therefore, it is possible to further improve the assemblability of the noise prevention elements, the terminals, and the jump wires.

Furthermore, in a sixth aspect of the present invention, in the electric motor according to the fourth aspect or the fifth aspect of the present invention, a surface on a side of the protrusion portion that receives the lead wire is a tapered surface so as to be tapered toward an insertion direction of the lead wire.

With the structure as described above, when the lead wire is inserted through the protrusion portion, the tapered surface functions as a guide to allow the lead wire to be inserted through the protrusion portion. Therefore, it is possible to further improve the assemblability of the noise prevention elements and the terminals.

Furthermore, in a seventh aspect of the present invention, in the electric motor according to any one of the first aspect to the sixth aspect of the present invention, the brush holder stay has a plurality of holder holes that contain and hold the terminals while exposing the plurality of first connection portions and the plurality of second connection portions to the first surface, and the terminals are contained into the holder holes from a direction in which a second surface of the brush holder stay that is reverse to the first surface faces.

With the structure as described above, it is possible to hold the terminals easily and securely by the brush holder stay. Furthermore, the terminals are contained into the brush holder stay from the same direction. Therefore, it is possible to improve the assemblability of the terminals.

Furthermore, in an eighth aspect of the present invention, the electric motor according to the seventh aspect of the present invention includes an insulator that holds the noise prevention elements and that is also superposedly arranged on the second surface, wherein between the insulator and the brush holder stay, the terminals are sandwiched.

With the structure as described above, it is possible to securely prevent the terminals from being positionally displaced and falling off.

Furthermore, in a ninth aspect of the present invention, in the electric motor according to the eighth aspect of the present invention, the noise prevention elements are arranged on a surface of the insulator that is opposite to the brush holder stay, and also the lead wires of the noise prevention elements are protruded from a surface of the insulator on the brush holder side; and when the insulator is superposedly arranged on the second surface, the lead wires of the noise prevention elements are inserted into throughholes of the terminals.

With the structure as described above, only with the insulator being superposedly arranged on the second surface of the brush holder stay, the lead wires of the noise prevention elements are arranged through the terminal. Therefore, it is possible to, for example, laser-weld them in this condition. Accordingly, it is possible to further improve the assemblability of the noise prevention elements, the terminal, and the jump wires.

Advantage of the Invention

According to the aforementioned electric motor, it is possible to improve the assemblability of the noise prevention elements, the terminals, and the jump wires on the brush holder stay. Furthermore, it is possible to reduce the number of assembly steps without being affected by the level of skill of the worker. Therefore, it is possible to reduce the cost of the electric motor.

DESCRIPTION OF THE EMBODIMENTS

Figure 1:
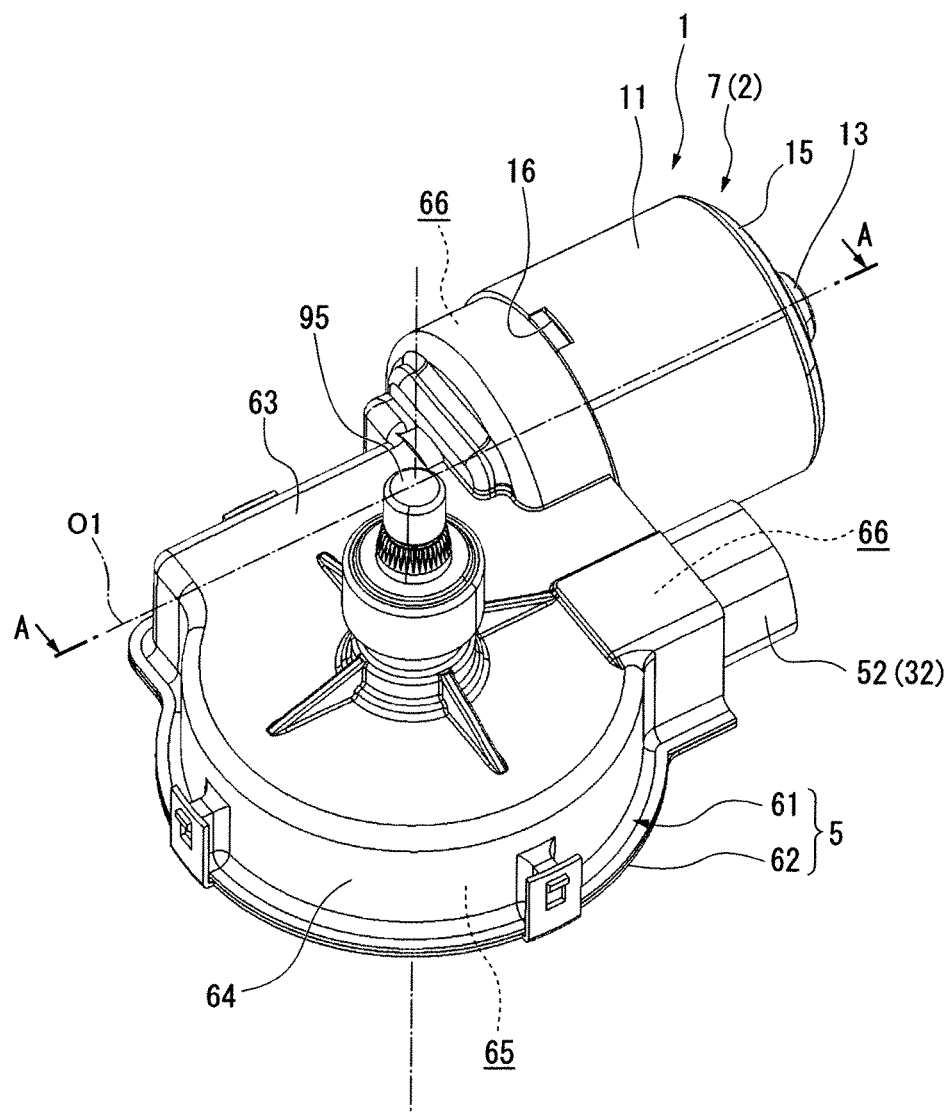
FIG. 1 is a perspective view of a wiper motor according to an embodiment of the present invention.

Hereunder is a description of an embodiment of the present invention based on the drawings.
<Wiper Motor>
FIG. 1 is a perspective view of a wiper motor 1 according to an embodiment of the present invention.

Figure 2:
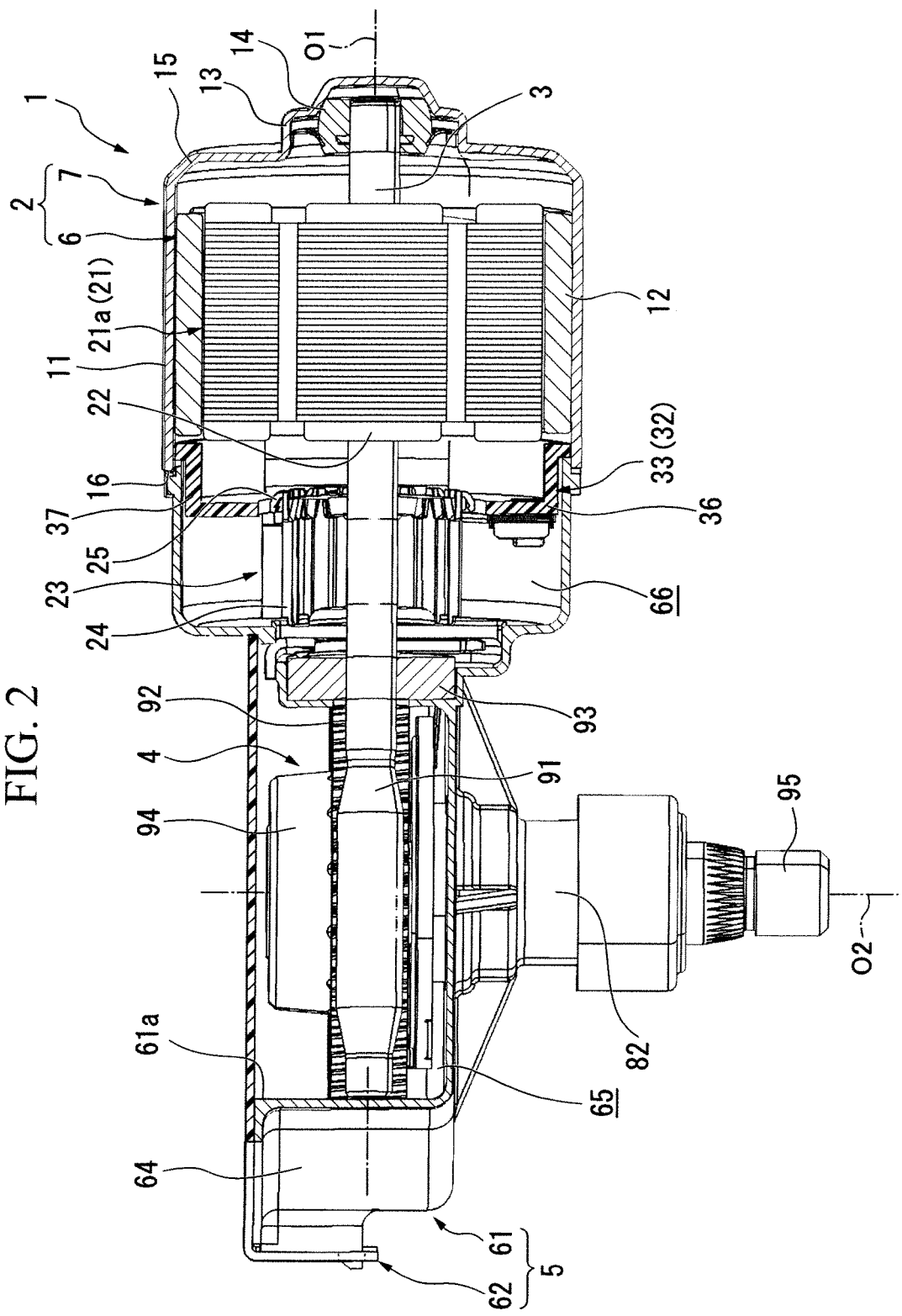
FIG. 2 is a cross-sectional view of FIG. 1, taking along the A-A line.

FIG. 2 is a cross-sectional view of FIG. 1, taken along the A-A line.

The wiper motor 1 is, for example, one for driving a front wiper (not shown in the figures) that wipes the front windshield of a vehicle.

As shown in FIG. 1 and FIG. 2, the wiper motor 1 includes: an electric motor 2; a deceleration mechanism 4 that is coupled to a rotation shaft 3 of the electric motor 2; and a gear housing 5 that contains the deceleration mechanism 4 and a part of the electric motor 2. The wiper motor 1 is configured so as to decelerate a drive force of the electric motor 2 by means of the deceleration mechanism 4 and then to transmit the drive force to a front wiper via an output shaft 95 (described later).

In the following description, a shaft line direction of the rotation shaft 3 is referred to as a rotation shaft direction O1. Of the rotation shaft direction O1, the side of the electric motor 2 (armature 6) is referred to as base end side, and the side of the deceleration mechanism 4 (worm 91) is referred to as front end side.

Figure 3:
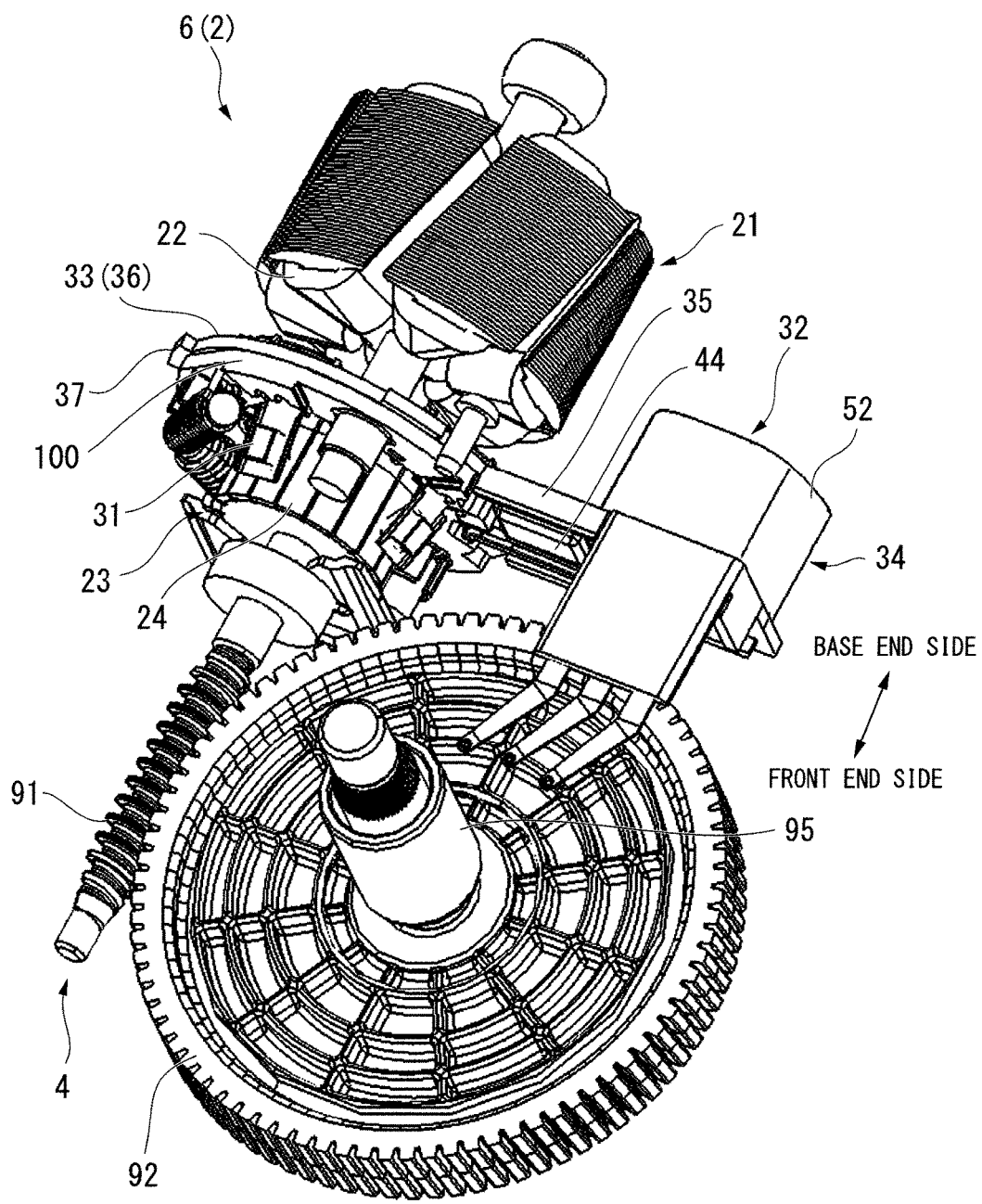
FIG. 3 is an exploded perspective view of the wiper motor according to the embodiment of the present invention.

Note that the rotation shaft direction O1 coincides with a thickness direction of a holder unit 32 (brush holder stay 33).
<Electric Motor>
FIG. 3 is an exploded perspective view of the wiper motor 1.

As shown in FIG. 2 and FIG. 3, the electric motor 2 has: a bottomed-cylinder-like yoke 7; and an armature 6 that is rotatably provided in the yoke 7.

On an inner circumferential surface of a barrel portion 11 of the yoke 7, a plurality of (for example, four) magnets 12 are disposed along a circumferential direction about the rotation shaft 3.

At a center of a bottom wall 15 of the yoke 7 in a radial direction, there is formed a boss portion 13 that protrudes toward an outer side of the rotation shaft direction O1. In the boss portion 13, there is provided a bearing 14 for pivotally supporting a base end portion of the rotation shaft 3.

In an opening edge of the barrel portion 11, a plurality of recess portions 16 that are recessed toward the base end side are formed so as to be spaced in the circumferential direction.

The armature 6 includes: an armature core 21 that is fitted onto and fixed to the rotation shaft 3; armature coils 22 that are wound around the armature core 21; and a commutator 23 that is arranged on the front end side with respect to the armature core 21 along the rotation shaft direction O1.

The armature core 21 is a lamination of plate members made from a magnetic material, which have been punched by press work or the like, in the rotation shaft direction O1. In the armature core 21, there are radially formed a plurality of teeth 21a around which the armature coils 22 are wound.

The commutator 23 is fitted onto and fixed to the rotation shaft 3. To an outer circumferential surface thereof, a plurality of segments 24 made from a conducting material are attached. The segment 24 is made of a plate-shaped metal piece that is long in the rotation shaft direction O1. The segments 24 are fixed side by side along the circumferential direction at regular intervals in a state of being insulated from each other.

On the base end side of each segment 24, there is integrally formed a riser 25 that is bent so as to be folded back to an outer side in the radial direction. Around the riser 25, an end portion of the armature coil 22 is hooked, and is fixed by fusing or the like. As a result, the segment 24 and its corresponding armature coil 22 are electrically linked to each other.

Furthermore, around each of the risers 25 corresponding to the segments 24 that are to be at the same potential, a connection wire (not shown in the figures) is hooked, and the connection wire is fixed to the corresponding riser 25 by fusing. The connection wires are for short-circuiting the segments 24 that are to be at the same potential. The connection wires are routed between the commutator 23 and the armature core 21.

Figure 4A:
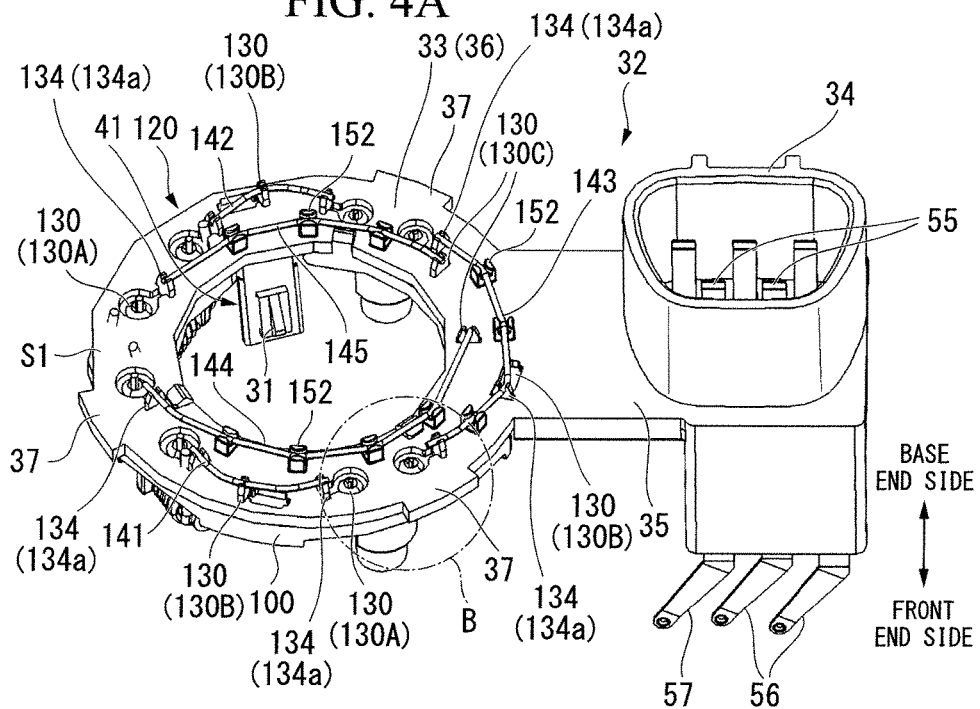
FIG. 4A is a perspective view of a holder unit according to the embodiment of the present invention when seen from a first surface side.
Figure 4B:
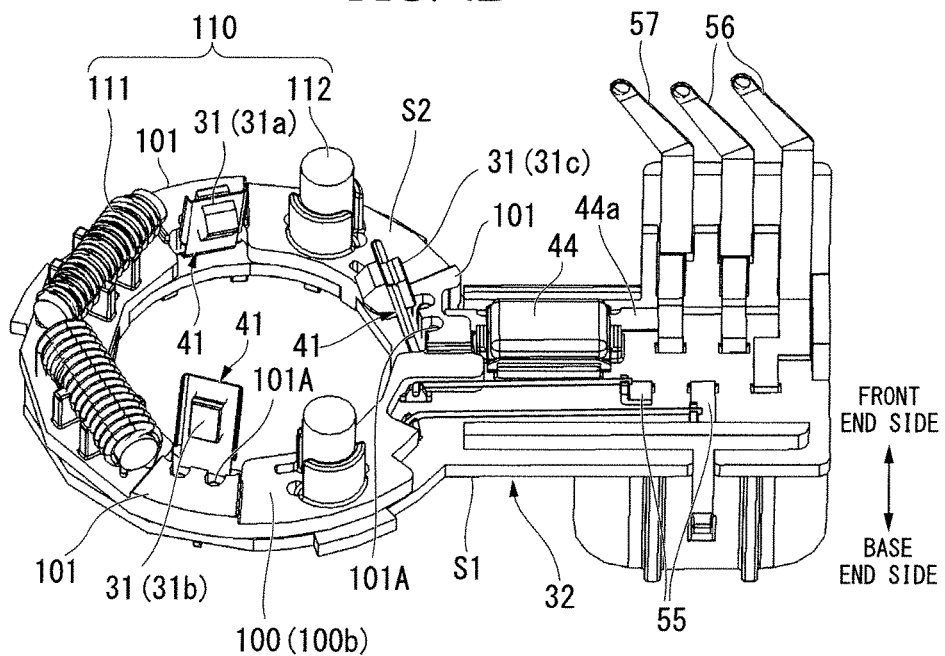
FIG. 4B a perspective view of the holder unit according to the embodiment of the present invention when seen from a second surface side.
Figure 5:
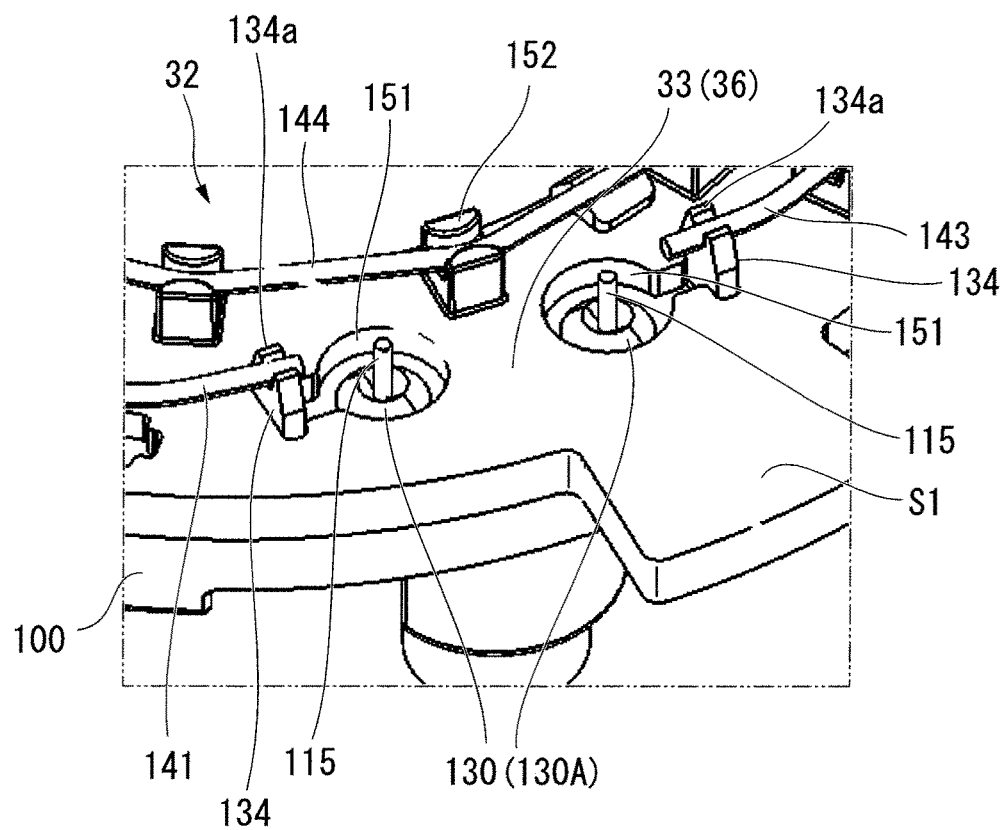
FIG. 5 is an enlarged view of the B part of FIG. 4A.
Figure 6:
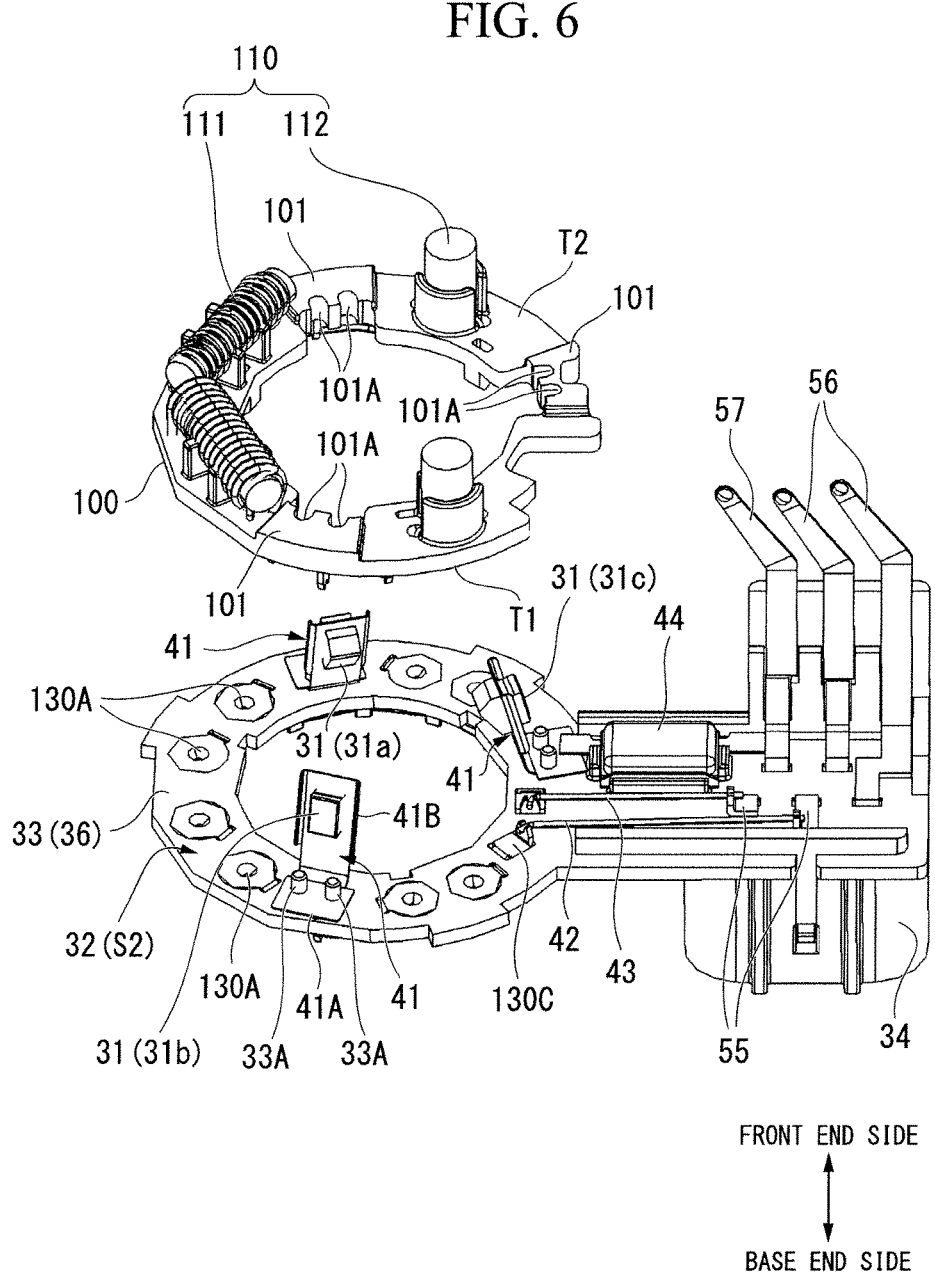
FIG. 6 is an exploded perspective view of the holder unit according to the embodiment of the present invention.
Figure 7:
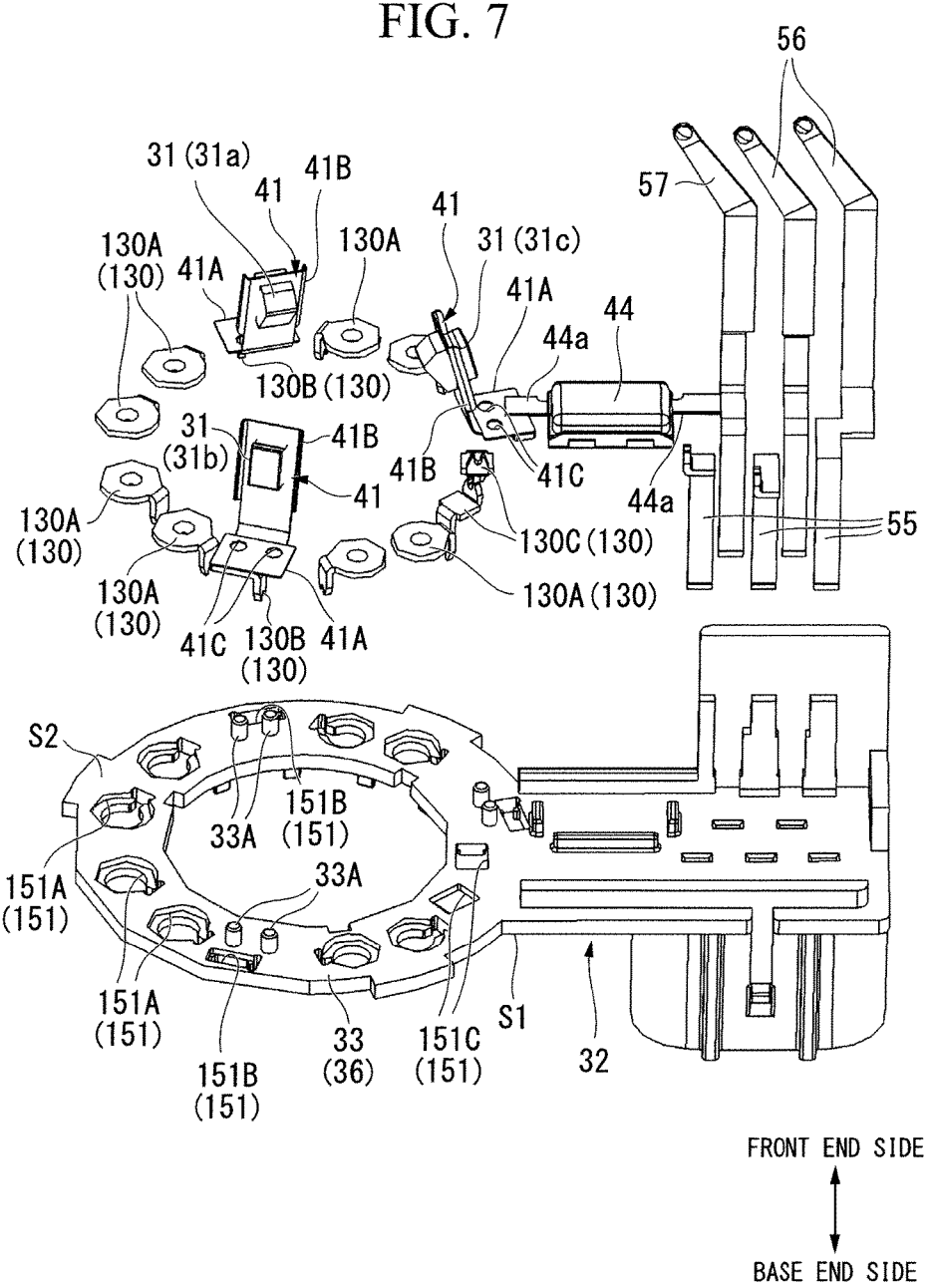
FIG. 7 is an exploded perspective view of the holder unit according to the embodiment of the present invention.

With the segments 24 of the commutator 23, brushes 31 are in sliding contact. Through the sliding contact with the segments 24, the brushes 31 supply electric current to the armature coil 22 via the segments 24. Via brush holders 41 (described later), the brushes 31 are held in the brush holder stay 33 (holder unit 32).
<Holder Unit>
FIG. 4A is a perspective view of the holder unit 32 when seen from a first surface S1 side. FIG. 4B is a perspective view of the holder unit 32 when seen from a second surface S2 side. FIG. 5 is an enlarged view of the B par of FIG. 4A. FIG. 6 and FIG. 7 are exploded perspective views of the holder unit 32.

As shown in FIG. 4A to FIG. 7, the holder unit 32 is one in which the following three are integrally formed of a resin material or the like, namely, a brush holder stay 33 that is disposed at a position where it overlaps the electric motor 2 in the rotation shaft direction O1; a connector portion 34 that is arranged so as to be adjacent to the brush holder stay 33 in the radial direction; and a bridge portion 35 that bridges between the brush holder stay 33 and the connector portion 34 in the radial direction.

The brush holder stay 33 includes an annular holder base portion 36. On an outer circumferential edge of the holder base portion 36, there is provided a positioning portion 37 so as to protrude toward the outer side in the radial direction. A front end portion of the positioning portion 37 is locked in a frame portion 61 (described later). As a result, positioning of the holder unit 32 with respect to the frame portion 61 along the rotation shaft direction O1 is performed.

An inner diameter of the holder base portion 36 is set to a dimension that allows the commutator 23 to be inserted therein. Through the inner side of the holder base portion 36, the commutator 23 is inserted.

In the brush holder stay 33, on a surface that faces the base end side (hereinafter, referred to as first surface S1), there is arranged a wiring member 120 that electrically connects the brushes 31.

The wiring member 120 has three types of terminal 130 (130A, 130B, 130C) and five jump wires 141 to 145.

Detailed configuration and the like of the wiring member 120 will be described later.

In the brush holder stay 33, on a surface that faces the front end side (hereinafter, referred to as second surface S2), there is superposedly arranged an insulator 100 that holds noise prevention elements 110. The second surface S2 is a surface reverse to the first surface S1.

Here, the holder unit 32 (brush holder stay 33, connector portion 34, bridge portion 35) is made of a resin whose color is black while the insulator 100 is formed of a resin whose color is natural color. Note that detailed structure and the like of the insulator 100 will be described later.

On the second surface S2 of the brush holder stay 33, brush holders 41 are fixed at three locations in the circumferential direction. The brush holder 41 is formed of a plate spring material with conductivity whose cross-section has a substantially L-shape. To be more specific, the brush holder 41 is made of: a connection portion 41A that is in abutment with the second surface S2 of the brush holder stay 33; and a holder main unit 41B that bends and extends obliquely from a radially inner end of the connection portion 41A toward an radially inner direction along the rotation shaft direction O1.

The connection portion 41A is formed in a substantially rectangular shape when seen in a planar view, in which two positioning holes 41C are formed. At each position of the brush holder stay 33 that corresponds to each positioning hole 41C, there is protrudingly provided a positioning pin 33A. With the positioning pins 33A being inserted into the positioning holes 41C, positioning of the brush holder 41 with respect to the brush holder stay 33 is performed.

On the other hand, on each holder main unit 41B, the brush 31 is held.

When seen in a side view, each brush 31 has a triangular shape whose width in the rotation shaft direction O1 is gradually narrower as it extends inwardly in the radial direction. As for each brush 31, its base end portion (radially-outer-side end portion) is fitted into the holder main unit 41B of the brush holder 41. On the other hand, its front end portion (radially-inner-side end portion) is biased to the commutator 23 side by the brush holder 41 so as to be brought into sliding contact with the segments 24 of the commutator 23. As a result, it is possible to feed electric power from a battery (not shown in the figures) to the commutator 23 via the brushes 31.

The brushes 31 include: a low speed brush 31a and a high speed brush 31b that are connected to the positive electrode side; and a common brush 31c that is connected to the negative electrode side and is also used as the low speed brush 31a and the high speed brush 31b.

The low speed brush 31a is a brush 31 that is used when the front wiper is low-speed driven as a result of a voltage being applied between the low speed brush 31a and the common brush 31c.

The high speed brush 31b is a brush 31 that is used when the front wiper is high-speed driven as a result of a voltage being applied between the high speed brush 31b and the common brush 31c.

Furthermore, the low speed brush 31a and the common brush 31c are disposed so as to be 180° spaced from each other in electrical angle, namely, so as to be 90° spaced from each other in mechanical angle (smaller angle (minor angle) out of the central angles formed by the brushes 31a, 31c about the rotation shaft 3). On the other hand, the high speed brush 31b is arranged so as to be a predetermined angle spaced (advanced) in the circumferential direction from the low speed brush 31a on a wider angle (major angle) side out of the central angles formed by the brushes 31a, 31c about the rotation shaft 3.

In the holder base portion 36, the low speed brush 31a and the high speed brush 31b are arranged on the side opposite to the connector portion 34 with respect to the commutator 23 (rotation shaft direction O1). The common brush 31c is arranged on the connector portion 34 side with respect to the commutator 23 (rotation shaft direction O1).

The bridge portion 35 has a plate shape with the rotation shaft direction O1 as its thickness direction. The bridge portion 35 extends from a part of the aforementioned holder base portion 36 in the circumferential direction toward an outward side in the radial direction. On the second surface S2 of the bridge portion 35, jump wires 42, 43 are laid toward the connector portion 34. Furthermore, a circuit breaker 44 is fixed to the second surface S2 of the bridge portion 35.

The connector portion 34 includes: a connector base portion 51 that extends on the same surface as the brush holder stay 33 and the bridge portion 35; and a connector reception portion 52 that is erected from the connector base portion 51 toward the base end side.

In the connector base portion 51, a plurality of power terminals 55 for feeding electric power, a plurality of contact plates 56 for a sensor, and a plurality of ground plates 57 are buried by insert molding or the like. Two power terminals 55, two contact plates 56, and a single ground plate 57 are buried, and are arranged so as to be spaced from each other in the connector base portion 51.

The power terminals 55 have a plate shape that extends along the rotation shaft direction O1. The power terminal 55 penetrates through the connector base portion 51. A base end side of the power terminal 55 protrudes toward an interior of the connector reception portion 52 and functions as a connector terminal. Furthermore, a front end side of the power terminal 55 is exposed to the second surface S2 side of the connector base portion 51.

To the front end sides of the power terminals 55, the jump wires 42, 43, which are electrically connected respectively to the low speed brush 31a and the high speed brush 31b, are connected on one-on-one basis.

The contact plates 56 are for detecting a rotation angle of a worm wheel 92 (described later) that constitutes the deceleration mechanism 4. Similarly to the power terminal 55, the contact plate 56 has a plate shape that extends along the rotation shaft direction O1. The contact plates 56 penetrate through the connector base portion 51. A base end side of the contact plate 56 protrudes toward the interior of the connector reception portion 52 and functions as a connector terminal. Furthermore, a frond end side of the contact plate 56 extends toward the worm wheel 92 (described later) while bending in a crank shape.

The ground plate 57 is a ground terminal. The ground plate 57 is formed similarly to the contact plate 56. To the ground plate 57, an end portion of the circuit breaker 44 is connected.

The circuit breaker 44 is fixed to the second surface S2 of the bridge portion 35. An end portion of the circuit breaker 44 is connected to the brush holder 41 that corresponds to the common brush 31c.

<Insulator>

Figure 8A:
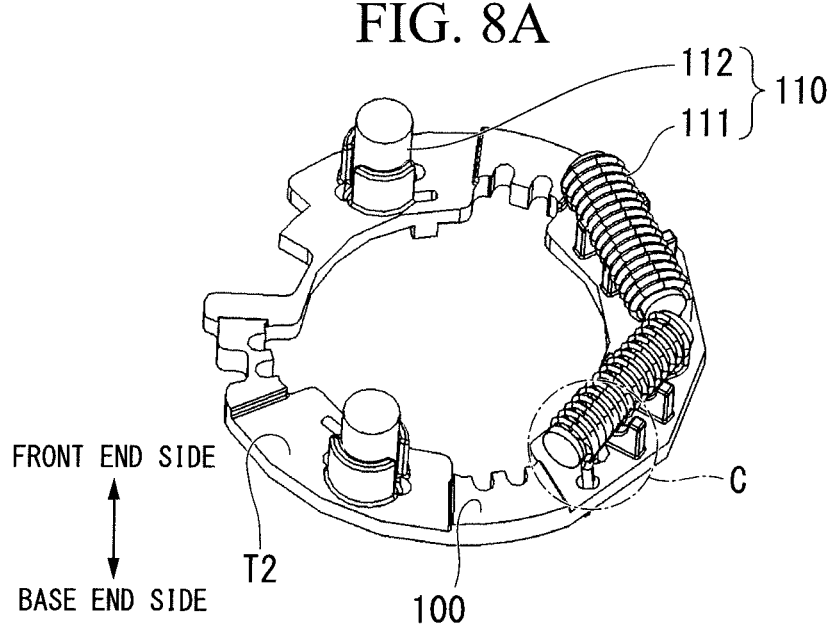
FIG. 8A is a perspective view of an insulator according to the embodiment of the present invention when seen from a second surface side.
Figure 8B:
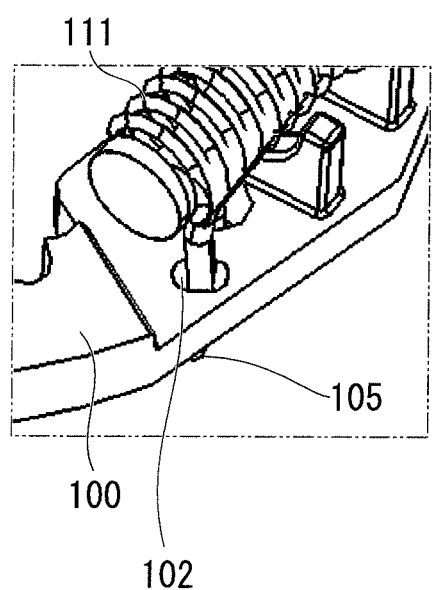
FIG. 8B is an enlarged view of the C part of FIG. 8A.
Figure 8C:
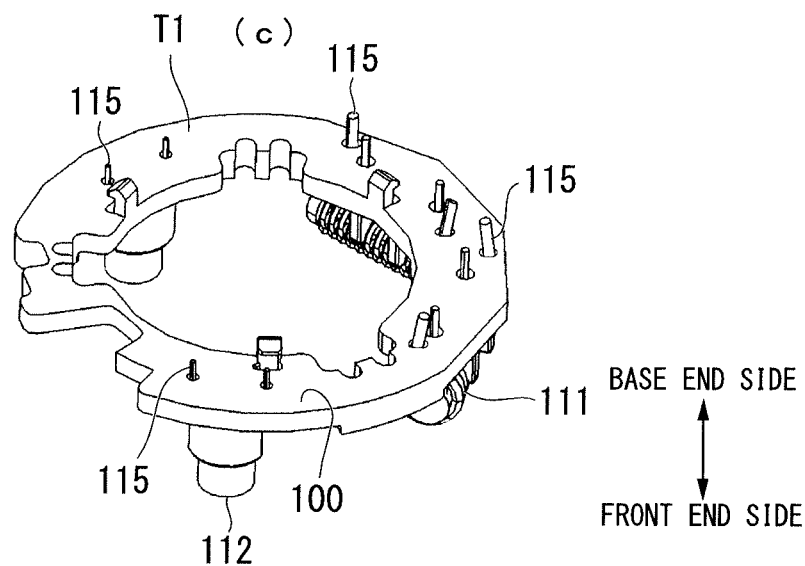
FIG. 8C is a perspective view of the insulator according to the embodiment of the present invention when seen from a first surface side.

FIG. 8A is a perspective view of the insulator 100 when seen from a second surface T2 side. FIG. 8B is an enlarged view of the C part of FIG. 8A. FIG. 8C is a perspective view of the insulator 100 when seen from a first surface T1 side.

As shown in FIG. 6 and FIG. 8A to FIG. 8C, the insulator 100 is superposedly arranged on the second surface S2 of the brush holder stay 33 (holder unit 32). The insulator 100 is formed in a shape of an annular flat plate that overlaps the holder base portion 36. On the second surface T2 of the insulator 100, which is on the side opposite to the brush holder stay 33, there is formed a laser irradiation protrusion portion 101 at a position corresponding to the connection portion 41A of each brush holder 41. To the laser irradiation protrusion portion 101, a laser beam at the time of laser-welding the brush holder 41 with the terminal 130 and with the circuit breaker 44 is irradiated (a detail thereof will be described later).

Furthermore, in the laser irradiation protrusion portion 101, recess portions 101A for receiving the positioning pins 33A of the brush holder stay 33 are formed at positions corresponding to the positioning pins 33A. As a result, the positioning between the brush holder stay 33 (holder unit 32) and the insulator 100 is performed.

Furthermore, on the second surface T2 side of the insulator 100, there are held two choke coils 111 and two capacitors 112, as the noise prevention elements 110.

The two choke coils 111 are held on the insulator 100 so as to be arranged between the high speed brush 31b and the low speed brush 31a. The two capacitors 112 are held on the insulator 100 so that one is arranged between the common brush 31c and the high speed brush 31b and that the other is arranged between the common brush 31c and the low speed brush 31a.

In the insulator 100, through-holes 102 that penetrate along the rotation shaft direction O1 are formed at positions corresponding to the choke coils 111 and the capacitors 112. Through the corresponding through-holes 102, lead wires 115 of the choke coils 111 and the capacitors 112 are inserted. The lead wires 115 of the choke coils 111 and the like are inserted into the corresponding through-holes 102 from the second surface T2 toward the first surface T1, and protrude from the first surface T1.

The through-hole 102 is formed in a tapered-hole-like shape that gradually decreases in diameter from the second surface T2 to the first surface T1, which is a surface on the brush holder stay 33 side.

Because the through-hole 102 is formed in a tapered-hole-like shape, a front end of the lead wire 115 of the noise prevention element 110 is inserted through the through-holes 102 as if sliding be along the inclined surface of the through-hole 102. Therefore, only with the noise prevention element 110 being arranged on the second surface T2 of the insulator 100, wiring assembly of the noise prevention element 110 is performed with ease. Then, the wires are connected to the terminals 130 (130A to 130C) that are arranged on the brush holder stay 33 side.

<Terminal>

Figure 9A:
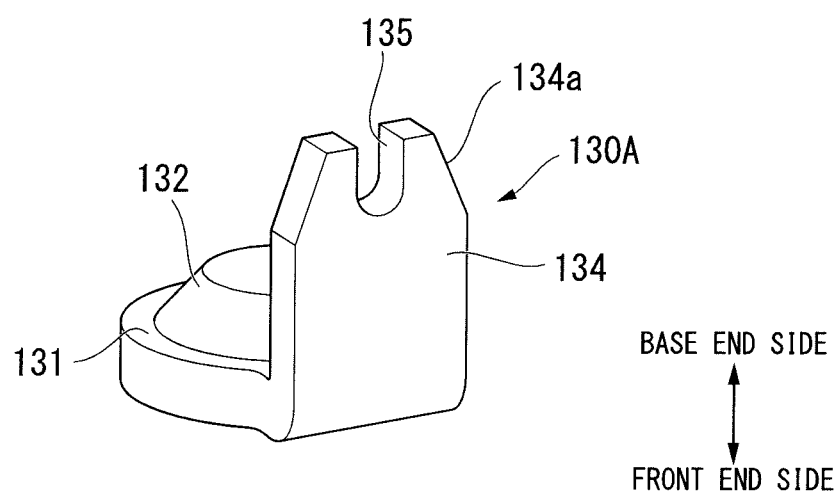
FIG. 9A is a perspective view of a first terminal according to the embodiment of the present invention.
Figure 9B:
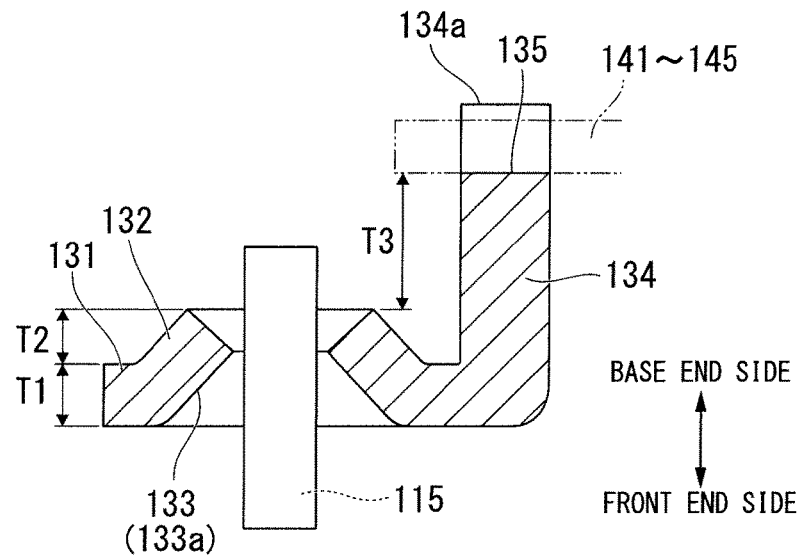
FIG. 9B is a cross-sectional view of the first terminal according to the embodiment of the present invention.
Figure 9C:
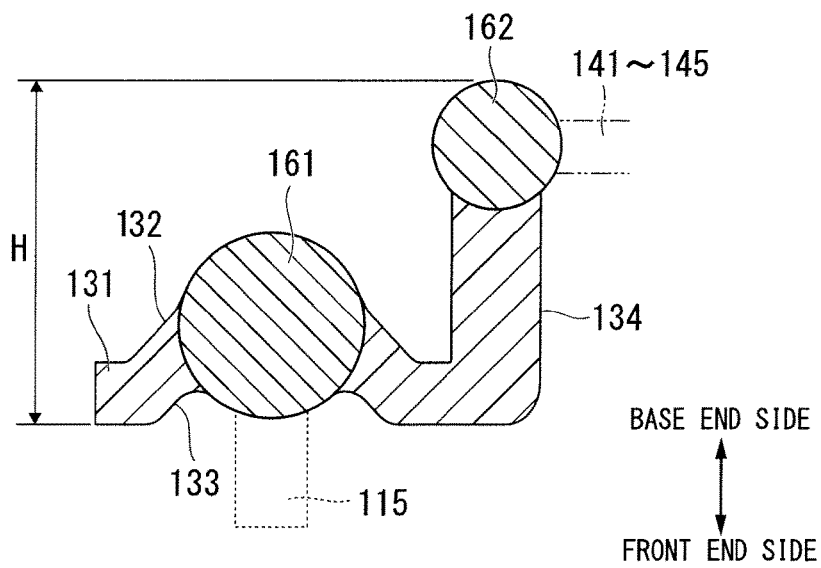
FIG. 9C is a diagram showing a state of the first terminal according to the embodiment of the present invention after laser welding.

FIG. 9A is a perspective view of the first terminal 130A. FIG. 9B is a cross-sectional view of the first terminal 130A. FIG. 9C is a diagram showing a state of the first terminal 130A after laser welding.

The three types of terminal 130 (first terminals 130A, second terminals 130B, and third terminals 130C) are arranged so as to be arranged (sandwiched) between the brush holder stay 33 and the insulator 100.

The first terminal 130A is a conducting member that electrically connects between the lead wire 115 of the noise prevention element 110 and one of the jump wires 141 to 145. The second terminal 130B is a conducting member that electrically connects between one of the brush holders 41 and one of the jump wires 141 to 143. The third terminals 130C are conducting members that electrically connect between the jump wires 144, 145 and the jump wires 42, 43.

The three types of terminals 130A, 130B, 130C have a similar shape.

The first terminal 130A has: a seat portion 131 that is to be in close contact with the brush holder stay 33; a protrusion portion 132 that protrudes from a center of the seat portion 131 to the base end side; and a hold portion 134 that protrudes from a side portion of the seat portion 131 to the base end side.

The second terminal 130B has: a seat portion 131; and a hold portion 134.

The third terminal 130C has: a seat portion 131; and two hold portions 134.

Below, the shape of the first terminal 130A will be described in detail as a representative of the three types of terminals 130A to 130C.

As described above, the first terminal 130A has: the seat portion 131; the protrusion portion 132; and the hold portion 134.

The seat portion 131 is a flat-plate-like section with a circular or polygonal shape. A thickness T1 of the seat portion 131 is set to, for example, approximately 1 mm. The protrusion portion 132 is a section that protrudes in a conical shape (tapered shape) from the center of the seat portion 131 to the base end side. A protrusion height T2 of the protrusion portion 132 from the seat portion 131 is set to, for example, approximately 2 mm.

At the center of the protrusion portion 132, there is formed a through-hole 133 along the rotation shaft direction O1. Through the through-hole 133, the lead wire 115 of the noise prevention element 110 is inserted. A rear surface (front end side) of the protrusion portion 132 is formed in a conical-hole shape. Namely, an inner surface of the through-hole 133 is a tapered surface 133a that gradually reduces in diameter as the through-hole 133 extends toward a protrusion direction of the protrusion portion 132.

The hold portion 134 is a flat-plate-like section that protrudes from the side portion of the seat portion 131 toward the base end side.

The hold portion 134 is formed so as to protrude from the seat portion 131 by, for example, approximately 3 to 4 mm. At a top portion of the hold portion 134, there is formed a U-shaped notch 135, which provides its front end portion with a two-pronged hold clasp portion 134a. A dimension T3 between a root portion (bottom portion of the notch 135) of the hold clasp portion 134a and a top portion of the protrusion portion 132 is set to approximately 1.5 mm. Into the notches 135, the jump wires 144, 145 are inserted. In other words, between the hold clasp portions 134a, the jump wires 144, 145 are held.

As shown in FIG. 6 and FIG. 7, the terminals 130 are contained and held in holder holes 151 that are formed in the brush holder stay 33. The holder hole 151 is a stepped through-hole, in which its inner circumference is provided with a step portion that faces toward the front end side.

An outline of the holder hole 151 is formed to as to be substantially the same as that of the seat portion 131 of the first terminal 130A. The step portion of the holder hole 151 is formed so as to be approximately 1 mm deep from the second surface S2. Namely, the step portion is formed so as to have the same length (depth) as the thickness of the seat portion 131.

When the first terminal 130A is to be contained in the holder hole 151, the first terminal 130A is inserted from the second surface S2 side of the brush holder stay 33 (from the direction in which the second surface S2 faces). Then, the protrusion portion 132 and the hold portion 134 are inserted through the holder hole 151, to thereby bring the seat portion 131 into abutment with the step portion.

As a result, the protrusion portion 132 and the hold portion 134 are exposed from the holder hole 151 that opens in the first surface S1 of the brush holder stay 33. On the other hand, the through-hole 133 with a tapered-hole shape is exposed from the holder hole 151 that opens in the second surface S2 of the brush holder stay 33.

With the insulator 100 being overlappingly placed on the second surface S2 of the brush holder stay 33, the first terminals 130A are sandwiched between the brush holder stay 33 (holder unit 32) and the insulator 100.

Similarly, as for the terminals 130B, 130C, while being contained and held in the holder holes 151 of the brush holder stay 33, the terminals 130 are sandwiched between the brush holder stay 33 (holder unit 32) and the insulator 100.

Note that on the front end side of the second terminal 130B, the brush holder 41 is arranged so as to be in close contact therewith. Namely, between the brush holder stay 33 and the insulator 100, the second terminals 130B and the brush holders 41 are sandwiched.

As shown in FIG. 6, when the insulator 100 is placed on the holder unit 32 (brush holder stay 33), the lead wires 115 that protrude from the first surface T1 of the insulator 100 are opposed to the through-holes 133 that are exposed to the second surface S2 of the brush holder stay 33.

As a result, when the brush holder stay 33 and the insulator 100 are brought into close contact with each other, the lead wires 115 of the noise prevention elements 110 are inserted into the through-holes 133 of the first terminals 130A. The inner surfaces of the through-holes 133 are tapered surfaces 133a. Therefore, the front ends of the lead wires 115 of the noise prevention elements 110 are inserted as if sliding along the inclined surfaces of the through-holes 133. Then, the lead wires 115 protrude to the second surface S2 side from the top portions of the seat portions 131.

Therefore, only with the insulator 100 being placed on the brush holder stay 33, the wiring assembly of the noise prevention element 110 is performed with ease.

As shown in FIG. 4A, the jump wires 141 to 145 are extended between (and on) the hold portions 134 that are exposed to the first surface S1 of the brush holder stay 33. Namely, the jump wires 141 to 145 are held in the hold clasp portions 134a of the hold portions 134.

In the hold portions 134 (hold clasp portions 134a) of the first terminals 130A, end portions of the jump wires 141 to 145 are held. Furthermore, in the hold portions 134 (hold clasp portions 134a) of the second terminals 130B, middle portions of the jump wires 141 to 143 are held. In addition, in the hold portions 134 (hold clasp portions 134a) of the third terminals 130C, end portions of the jump wires 144, 145 are held.

Note that the jump wires 143 to 145 are held also in hold clasp portions 152 that are formed on the first surface S1 of the brush holder stay 33 (holder unit 32).

Here, as shown in FIG. 9C, the seat portion 131 and the lead wire 115 that protrudes from the seat portion 131 are connected by laser welding to form a first connection portion 161 at which the two are electrically connected.

The first connection portion 161 is formed by irradiating a laser beam from the first surface S1 side of the brush holder stay 33 (holder unit 32).

Furthermore, each hold portion 134 and the corresponding one of the jump wires 141 to 145, which is extended over the hold clasp portion 152 of this hold portion 134, are connected by laser welding to form a second connection portion 162 at which the two are electrically connected. The second connection portion 162 is formed by irradiating a laser beam from the first surface S1 side of the brush holder stay 33.

It is desirable that the color of the brush holder stay 33 be natural color. With the brush holder stay 33 being set so as to have this color, it is possible to improve the connection workability by laser welding.

Thus, the first connection portion 161 and the second connection portion 162 are formed by irradiating a laser beam from the first surface S1 side of the brush holder stay 33. Namely, the first connection portion 161 and the second connection portion 162 are formed by irradiating a laser beam in the same direction.

Here, in each of the terminals 130A to 130C, the dimension T3 between the root portion (bottom portion of the notch 135) of the hold clasp portion 134a and the top portion of the protrusion portion 132 is set to approximately 1.5 mm. Therefore, the first connection portion 161 and the second connection portion 162 are arranged so that a distance H in the rotation shaft direction O1 (thickness direction of the brush holder stay 33) is in a range of 4 min or less. Therefore, because the focal length of the laser beam is almost the same for the two, it is possible to form the first connection portion 161 and the second connection portion 162 only by a laser welding machine (not shown in the figures) causing the beam to scan along the surface direction of the brush holder stay 33 without causing the beam to scan in the thickness direction of the brush holder stay 33.

Next, based on FIG. 4B, FIG. 7, FIG. 10A to FIG. 10D, connection work of the second terminal 130B with the two brush holders 41 that respectively hold the low speed brush 31a and the high speed brush 31b, and connection work of the brush holder 41 that holds the common brush 31c with the circuit breaker 44 will be described.

FIG. 10A to FIG. 10D are explanation diagrams showing connection work of the second terminal 130B with the two brush holder 41 that respectively hold the low speed brush 31a and the high speed brush 31b.

Figure 10A:
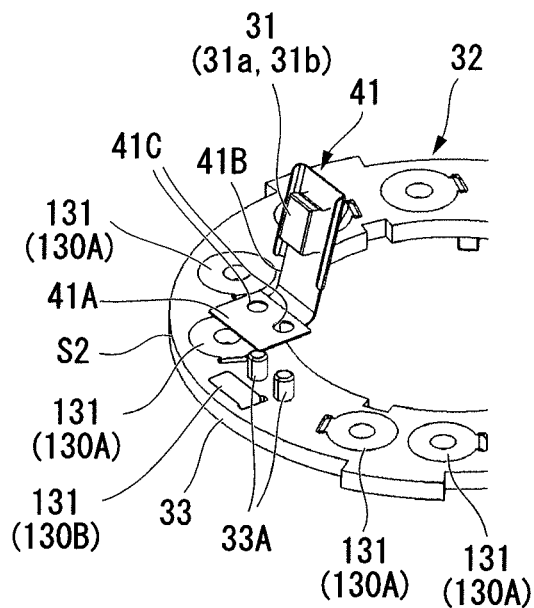
FIG. 10A is an explanation diagram showing connection work of the second terminal and the brush holder according to the embodiment of the present invention.
Figure 10B:
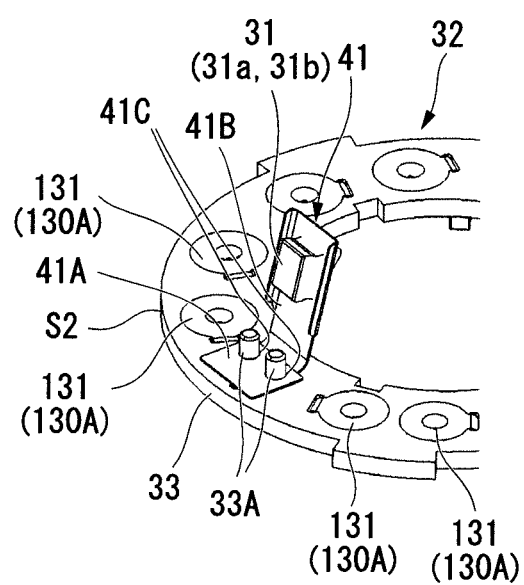
FIG. 10B is an explanation diagram showing the connection work of the second terminal and the brush holder according to the embodiment of the present invention.

As shown in FIG. 10A and FIG. 10B, each brush holder 41 is arranged on the second surface S2 side of the brush holder stay 33, to which the terminals 130A to 130C have already been attached. At this time, on the brush holder stay 33, the positioning pins 33A are formed while in the brush holder 41, the positioning holes 41C are formed. Therefore, it is possible to perform positioning of the brush holder 41 with respect to the brush holder stay 33 with ease. As a result of this, the seat portion 131 of the second terminal 130B and the connection portion 41A of the brush holder 41 securely overlap each other.

Furthermore, as shown in FIG. 4B and FIG. 7, on the connection portion 41A of the brush holder 41 that hold the common brush 31c, a terminal 44a of the circuit breaker 44 is overlapped.

Figure 10C:
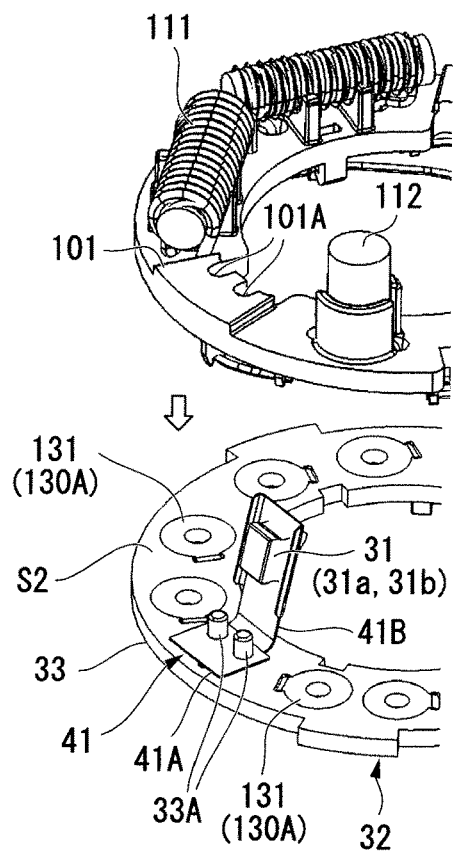
FIG. 10C is an explanation diagram showing the connection work of the second terminal and the brush holder according to the embodiment of the present invention.
Figure 10D:
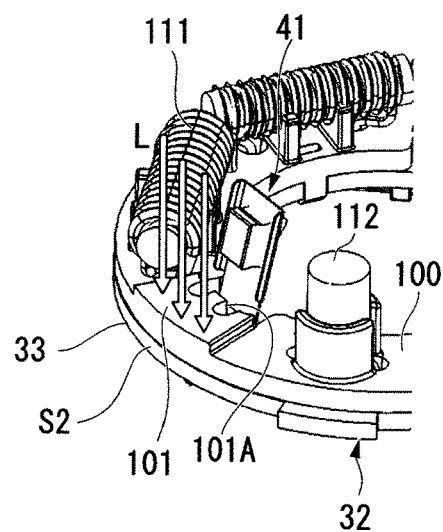
FIG. 10D is an explanation diagram showing the connection work of the second terminal and the brush holder according to the embodiment of the present invention.

Next, as shown in FIG. 10C and FIG. 10D, the insulator 100 is placed on the second surface S2 of the brush holder stay 33. As a result, between the brush holder stay 33 and the insulator 100, the seat portions 131 of the terminals 130 and the connection portions 41A of the brush holder 41 are sandwiched.

Here, in the laser irradiation protrusion portion 101 of the insulator 100, the recess portions 101A for receiving the positioning pins 33A of the brush holder stay 33 are formed at positions that correspond to the positioning pins 33A. Therefore, it is possible to perform positioning between the brush holder stay 33 and the insulator 100 with ease.

Then, as shown in FIG. 10D, a laser beam L is irradiated from above the laser irradiation protrusion portion 101 of the insulator 100. Here, the insulator 100 is formed of a resin whose color is natural color. On the other hand, the holder unit 32 (brush holder stay 33, connector portion 34, bridge portion 35) is formed of a resin whose color is black. Natural color is assumed to be good in transmission of heat (transmittance of the laser beam L). On the other hand, black color is assumed to be good in absorption of heat.

Therefore, the heat by the laser beam L is efficiently transmitted to the connection portion 41A of the brush holders 41, and to the seat portion 131 of the second terminal 130B and the terminal 44a of the circuit breaker 44 via the laser irradiation protrusion portion 101. As a result, the seat portions 131 of the second terminals 130B and the connection portions 41A of the corresponding brush holders 41 are laser welded. Furthermore, the terminal 44a of the circuit breaker 44 and the connection portion 41A of the corresponding brush holder 41 are laser welded.

Moreover, into the laser irradiation protrusion portions 101, the positioning pins 33A of the brush holder stay 33 are inserted. Furthermore, the positioning pins 33A (brush holder stay 33) are formed of a resin. Therefore, the heat by the laser beam L is transmitted to the positioning pins 33A via the laser irradiation protrusion portion 101. As a result, the positioning pins 33A are molten to adhere the laser irradiation protrusion portion 101 and the positioning pin 33A to each other. Thus, the fixation of the holder unit 32 and the insulator 100 to each other is completed.

<Gear Housing>

As shown in FIG. 1 and FIG. 2, the gear housing 5 includes: a frame portion 61 formed in a bottomed-cylindrical shape that is manufactured by aluminum die casting; and a bottom plate 62 made of a resin that closes an opening portion 61a of the frame portion 61.

The interior of the frame portion 61 is defined into: a deceleration mechanism containing portion 65 that contains the deceleration mechanism 4; and a holder unit containing portion 66 that is provided continuously from a part of a circumferential wall portion 64 and contains the holder unit 32.

<Deceleration Mechanism>

As shown in FIG. 2 and FIG. 3, the deceleration mechanism 4 includes: a worm 91 that is coupled to the rotation shaft 3 of the electric motor 2; and a worm wheel 92 that meshes with the worm 91.

Of the worm 91, a base end side is coupled to the rotation shaft 3 in the deceleration mechanism containing portion 65, and a front end side is rotatably supported by a bearing (not shown in the figures) in the deceleration mechanism containing portion 65. Furthermore, of the worm 91, a coupling portion to the rotation shaft 3 (front end portion of the rotation shaft 3) is rotatably supported by a rolling-element bearing 93 that is disposed in the frame portion 61.

The worm wheel 92 is contained in the deceleration mechanism containing portion 65, and is configured so as to rotate with the rotation of the worm 91. At a central portion (hub portion) of the worm wheel 92, there is formed a boss portion 94 that protrudes toward the bottom plate 62 side. Into the boss portion 94, a based end portion of the output shaft 95 is press-fitted from the frame portion 61 side.

A front end portion of the output shaft 95 protrudes to the outside of the frame portion 61 through a sleeve 82 of the frame portion 61. To this protrusion portion, an external mechanism for driving the front wiper (not shown in the figures) is coupled. Furthermore, the output shaft 95 is rotatably supported by the aforementioned slide bearing 83 in the sleeve 82.

In the wiper motor 1 structured as described above, when a wiper switch (not shown in the figures) is switched from OFF position to LOW position, drive current is supplied to the low speed brush 31a of the electric motor 2 from the battery. As a result, the electric motor 2 starts a drive in low-speed operation mode. To be more specific, when the electric motor 2 is driven, the driving force is decelerated in the deceleration mechanism 4, and then, is transmitted to an external mechanism of the front wiper via the output shaft 95. As a result, the front wiper is actuated to make it possible to wipe off dust, raindrops, and the like that have attached to the front windshield.

On the other hand, when the wiper switch is switched to HIGH position, drive current is supplied to the high speed brush 31b of the electric motor 2 from the battery. As a result, the electric motor 2 starts a drive in high-speed operation mode, which is a mode faster than the aforementioned low-speed operation mode.

As described above, in the wiper motor 1 of the present embodiment, each of the first connection portions 161, in which the noise prevention element 110 and the terminal 130 are connected, and each of the second connection portions 162, in which the terminal 130 and the jump wire 141 or the like are connected, are disposed only on the first surface S1 of the brush holder stay 33 (holder unit 32). As a result, when connection work of the noise prevention element 110 to the terminals 130 and connection work of the terminals 130 to the jump wire 141 are done, it is possible to perform the assembly without turning over the brush holder stay 33 (holder unit 32). Therefore, the assemblability of the wiring member 120 is improved, to thereby make it possible to reduce the number of manufacturing steps and the manufacturing cost.

Furthermore, the terminal 130 has: a flat seat portion 131 that is to be in close contact with the brush holder stay 33; a protrusion portion 132 that protrudes to the base end side (direction in which the first surface S1 faces) and also through which the lead wire 115 of the noise prevention element 110 is inserted; and a hold portion 134 that protrudes to the base end side and also holds the jump wire 141 or the like.

Therefore, the seat portion 131 is brought into close contact with the brush holder stay 33, and the top portion of the protrusion portion 132 functions as the first connection portion 161. Furthermore, the top portion of the hold portion 134 functions as the second connection portion 162. As a result, it is possible to maintain the first connection portions 161 and the second connection portions 162 constant in position.

Furthermore, the brush holder stay 33 has holder holes 151 each of which contains and holds the terminal 130 while exposing the first connection portion 161 and the second connection portion 162 to the first surface S1. Then, the terminal 130 is contained in the holder hole 151 from the second surface S2 side.

Therefore, by the brush holder stay 33 (holder unit 32), it is possible to hold the terminals 130 easily and securely. Furthermore, the terminals 130 are contained in the same direction with respect to the brush holder stay 33. Therefore, it is possible to improve the assemblability of the wiring member 120 (terminal 130).

Furthermore, the wiper motor 1 includes the insulator 100 that holds the noise prevention elements 110 and that is also superposedly arranged on the second surface S2. Between the insulator 100 and the brush holder stay 33 (holder unit 32), the terminals 130 are sandwiched. Therefore, it is possible to securely prevent the terminals 130 from being positionally displaced and from falling off.

When the insulator 100 is superposedly arranged on the second surface S2, the lead wires 115 of the noise prevention elements 110 are inserted into the tapered-hole-like through-holes 133 that are formed in the protrusion portions 132. Therefore, only with the insulator 100 being superposedly arranged on the second surface S2 of the brush holder stay 33, the lead wires 115 of the noise prevention elements 110 are arranged through the seat portions 131 of the terminals 130. Therefore, it is possible to laser-weld these pairs in this condition. Accordingly, it is possible to further improve the assemblability of the wiring member 120.

Furthermore, each of the terminals 130A to 130C is formed so that the dimension T3 between the root portion (bottom portion of the notch 135) of the hold clasp portion 134a and the top portion of the protrusion portion 132 is approximately 1.5 mm. Moreover, the first connection portion 161 and the second connection portion 162 are arranged so that the distance H in the rotation shaft direction O1 (thickness direction of the brush holder stay 33) is in a range of 4 mm or less. Therefore, because the focal length of the laser beam is almost the same for the two, a laser welding machine (not shown in the figures) will not cause the beam to scan in the thickness direction of the brush holder stay 33. Only with the laser welding machine causing the beam to scan in the surface direction of the brush holder stay 33, it is possible to form the first connection portion 161 and the second connection portion 162. Therefore, it is possible to further improve the assemblability of the wiring member 120.

Furthermore, in the holder unit 32, the seat portions 131 of the terminals 130 (130A, 130B, 130C) and the connection portions 41A of the brush holders 41 are arranged between the brush holder stay 33 (holder unit 32) and the insulator 100. Therefore, only with the seat portions 131 and the connection portions 41A being sandwiched between the brush holder stay 33 and the insulator 100, assembly of the terminals 130 and the brush holders 41 to the holder unit 32 is completed. Accordingly, it is possible to simplify the assembly work of the terminals 130 and the brush holders 41.

Furthermore, the color of the resin that forms the insulator 100 is set to natural color, which is assumed to be good in transmission of heat (transmittance of laser beam L). Namely, the whole of the insulator 100 is formed as an easy-to-transmit-heat portion. Therefore, with the laser beam L being irradiated from above the laser irradiation protrusion portion 101 of the insulator 100, the seat portion 131B of the second terminal 130B and the connection portion 41A of the brush holder 41 are laser-welded. Furthermore, the terminal 44a of the circuit breaker 44 and the connection portion 41A of the brush holder 41 are laser welded. Therefore, in the step of the connection work of the terminals 130, the brush holders 41, and the circuit breaker 44, it is not required to perform caulking or resistance welding, and hence, it is possible to make the connection step easier.

Furthermore, the color of the resin that forms the holder unit 32 (brush holder stay 33, connector portion 34, bridge portion 35) is set to black, which is assumed to be good in heat absorption. Therefore, it is possible for the brush holder stay 33 to efficiently absorb the heat of the laser beam L that is irradiated from the insulator 100. Accordingly, it is possible to carry out the step of connection work of the terminals 130, the brush holders 41, and the circuit breaker 44 more efficiently.

Furthermore, in the connection portion 41A of each brush holder 41, the positioning holes 41C are formed. On the other hand, on the brush holder stay 33, the positioning pins 33A that are capable of being inserted through the positioning holes 41C are protrudingly provided. Therefore, it is possible to easily perform positioning of the brush holders 41 with respect to the brush holder stay 33, to thereby make it possible to reduce the number of manufacturing steps.

Furthermore, in the laser irradiation protrusion portion 101 of the insulator 100, the recess portions 101A that receives the positioning pins 33A of the brush holder stay 33 are formed. Therefore, it is possible to easily perform positioning between the brush holder stay 33 (holder unit 32) and the insulator 100, and hence, to further reduce the number of manufacturing steps. In addition to this, the positioning pin 33A is formed of a resin. Therefore, it is possible to adhere the laser irradiation protrusion portion 101 and the positioning pins 33A to each other by the laser beam L. As a result, at the same time of the step of connection work of the terminals 130, the brush holders 41, and the circuit breaker 44, it is possible to complete the step of fixing the holder unit 32 to the insulator 100 as well. Accordingly, it is possible to further reduce the number of manufacturing steps.

Note that the technical scope of the present invention is not limited to the aforementioned embodiment, and various modifications can be made without departing from the spirit or scope of the present invention.

<Modification of Terminal>

Figure 11A:
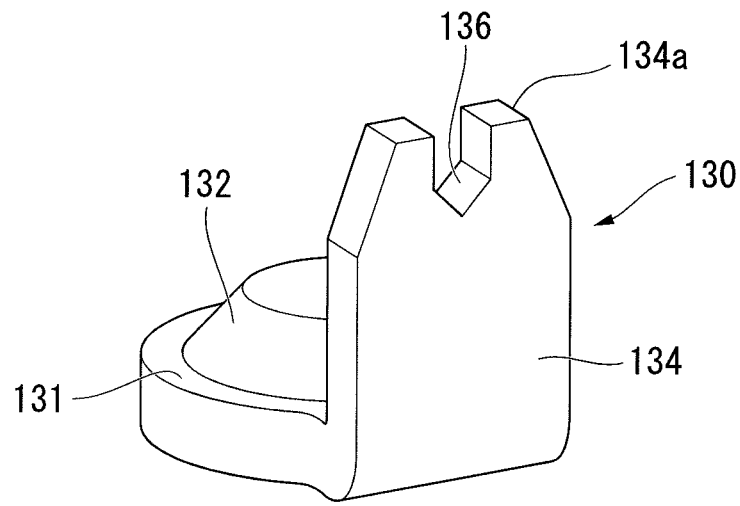
FIG. 11A a diagram showing a first modification out of the modifications of the terminal according to the embodiment of the present invention.
Figure 11B:
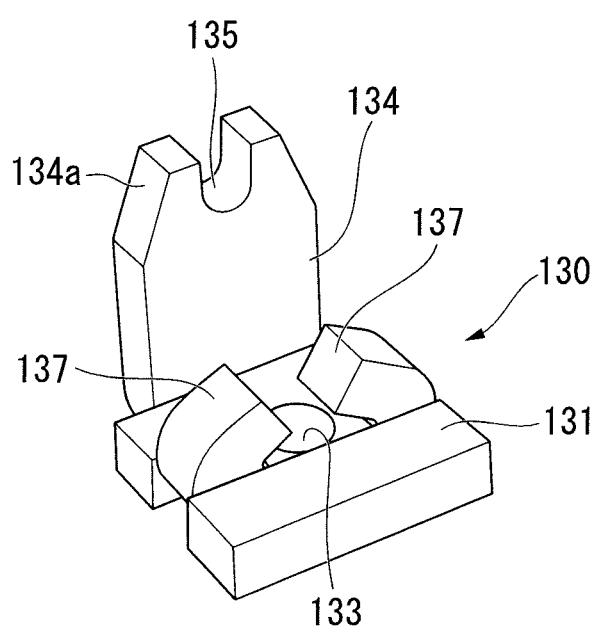
FIG. 11B is a diagram showing a second modification out of the modifications of the terminal according to the embodiment of the present invention.

FIG. 11A is a diagram showing a first modification out of the modifications of the terminal 130. FIG. 11B is a diagram showing a second modification out of the modifications of the terminal 130.

The shape of the notch 135 that is formed in the top portion of the hold portion 134 is not limited to a U-shape. As shown in FIG. 11A, a V-shaped notch 136 may be provided.

The protrusion portion 132 is not limited to one that conically protrudes from the center of the seat portion 131. As shown in FIG. 11B, a pair of bent portions 137, which are made by bending parts of the seat portion 131, may be provided. The bent portions 137 are formed so as to surround the through-hole 133. In this case, the through-hole 133 is not formed in a tapered-hole-shape but in a cylindrical shape.

<Modification of Brush Holder>

Figure 12A:
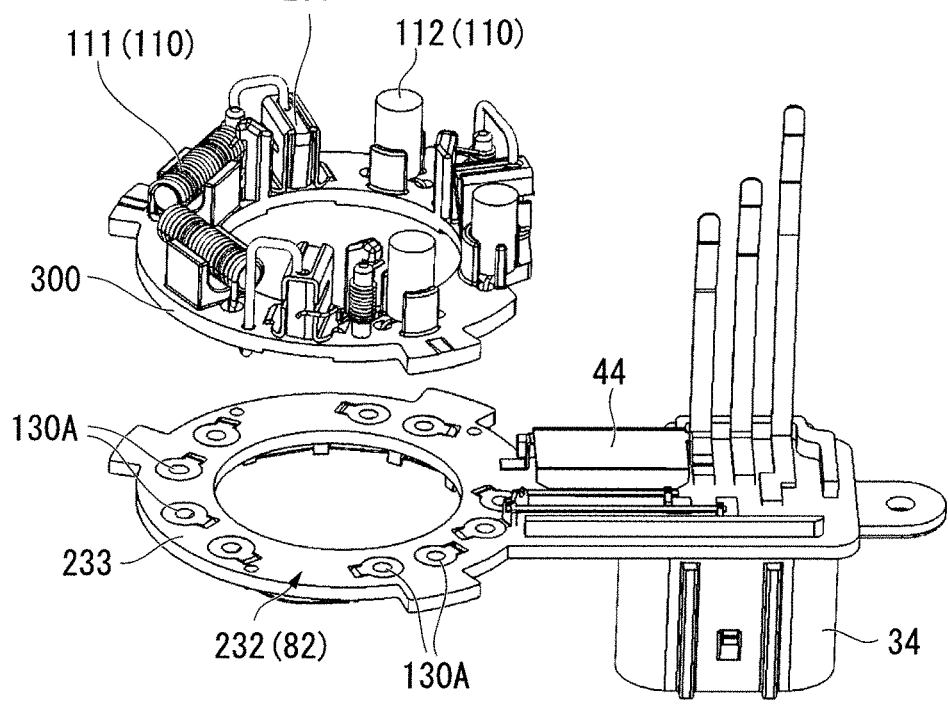
FIG. 12A is an exploded perspective view of a modification of the holder unit according to the embodiment of the present invention.
Figure 12B:
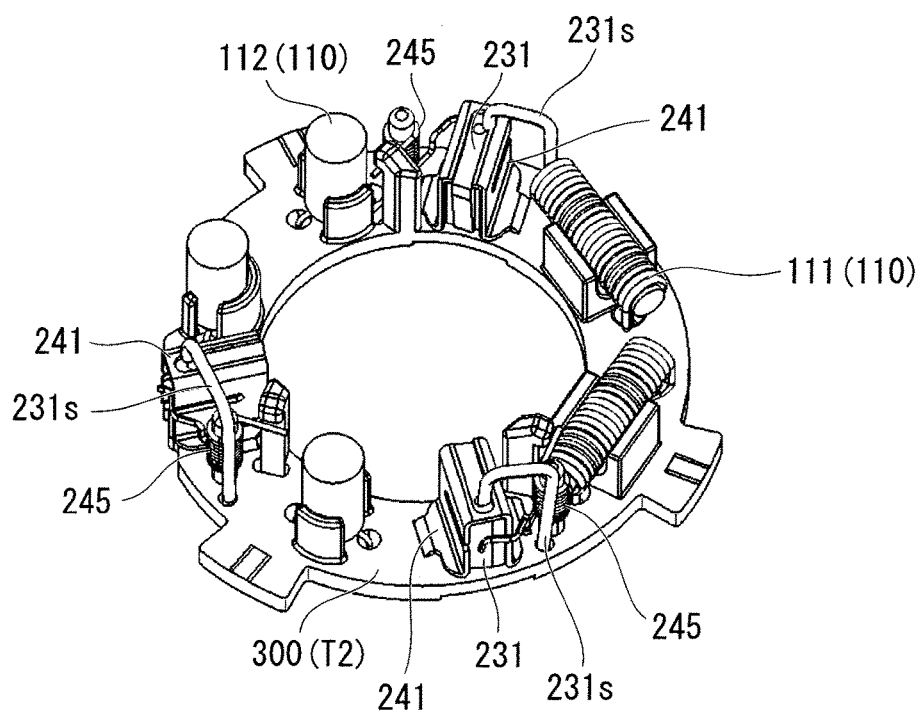
FIG. 12B is a perspective view of the modification of the holder unit according to the embodiment of the present invention when a modification of the insulator is seen from the second surface side.

FIG. 12A is an exploded perspective view of a modification of the holder unit 32 (holder unit 232). FIG. 12B is a perspective view of a modification of the insulator 100 (insulator 300) when seen from a second surface side.

Figure 13:
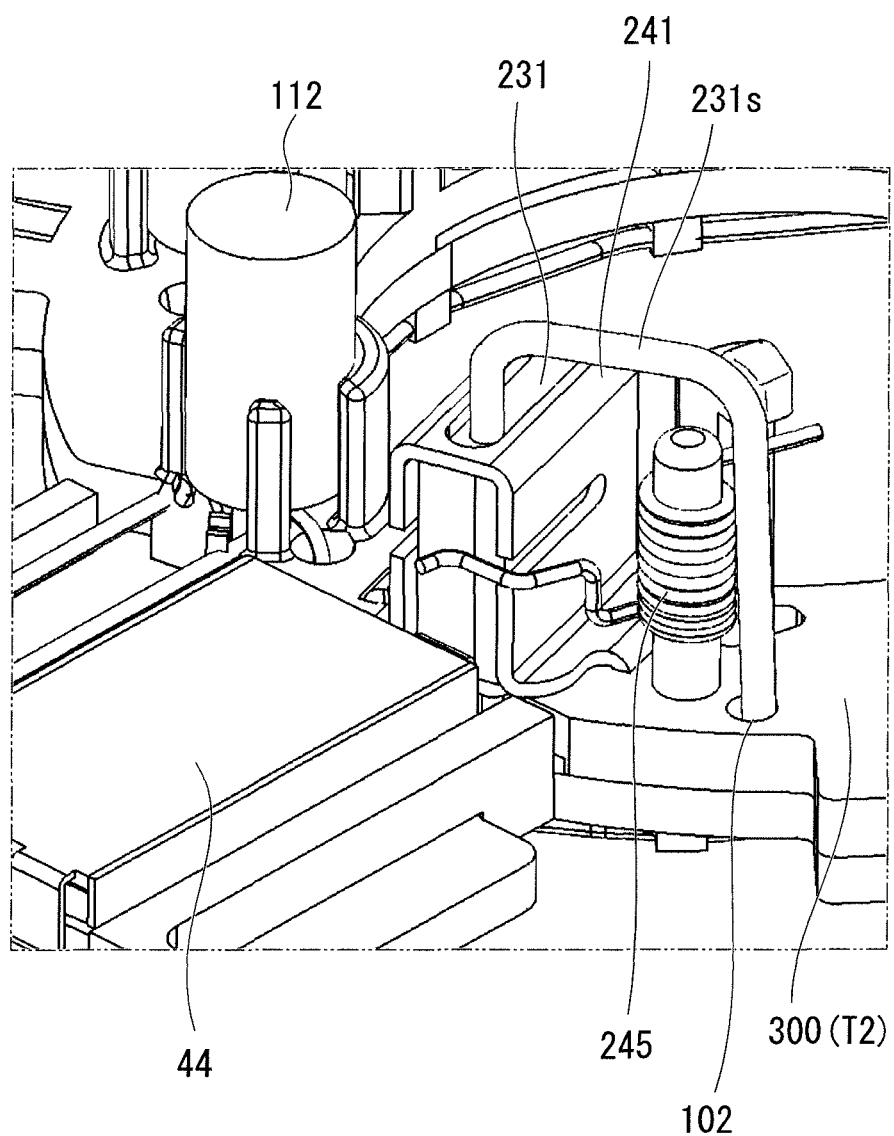
FIG. 13 is an enlarged perspective view of the modification of the insulator according to the embodiment of the present invention when seen from the second surface side.

FIG. 13 shows the modification of the insulator 100 (insulator 300). It is an enlarged perspective view thereof when seen from the second surface side.

In the holder unit 32 of the aforementioned embodiment, the structure is not limited to the case where the brush 31 is held by the brush holder stay 33 via the brush holder 41.

As shown in FIG. 13, a brush 231 may be held on the insulator 300.

The brush 231 is formed of a conducting material such as black lead, and is held on the insulator 300 via a box-shaped brush holder 241. On a side of the brush holder 241, there is arranged a spring member 245 that is fixed to the insulator 300.

In a state of being contained and held in the brush holder 241, the brush 231 is biased inwardly in the radial direction by the spring member 245 to be brought into sliding contact with segments 24 of a commutator 23.

In the insulator 300, there are formed through-holes 102 that penetrate in the rotation shaft direction O1. Through the through-hole 102, there is inserted a pigtail 231s that protrudes from the brush 231.

The pigtail 231s of the brush 231 is inserted into the through-hole 102 from a second surface T2 to a first surface T1, and protrudes from the first surface T1.

The through-hole 102 is formed in a tapered-hole-like shape. Therefore, only with the brushes 231 being arranged on the second surface T2 of the insulator 300, it is possible to perform wiring assembly of the pigtail 231s with ease. Then, the pigtail 231s is connected to a terminal 130 that is arranged on a brush holder stay 233 side.

<Modification of Jump Wire>

Figure 14A:
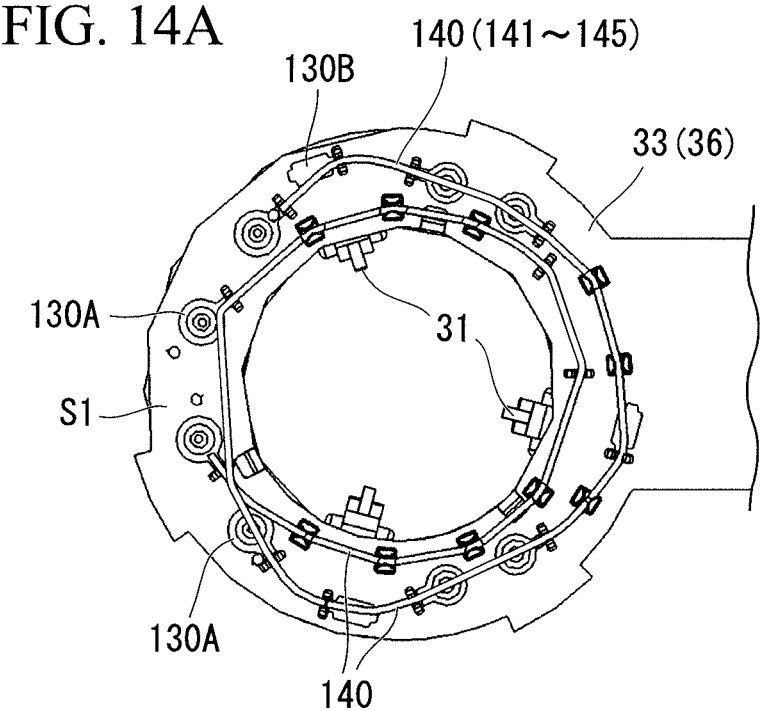
FIG. 14A is a diagram showing a wiring step of jump wires according to a modification of the embodiment of the present invention.
Figure 14B:
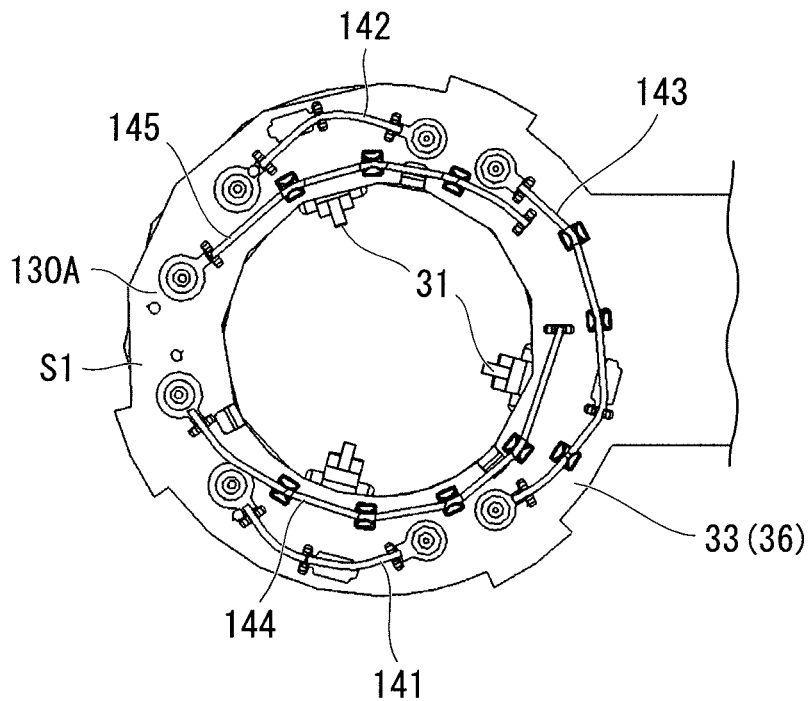
FIG. 14B is a diagram showing a cut-out step of the jump wires according to the modification of the embodiment of the present invention.

FIG. 14A is a diagram showing a step of wiring the jump wires 141 to 145 of the modification. FIG. 14B is a diagram showing a cut-out step of the jump wires 141 to 145 of the modification.

The jump wires 141 to 145 of the aforementioned embodiment are extended between (and on) the corresponding hold portions 134 that are exposed to the first surface S1 of the brush holder stay 33. Namely, the jump wires 141 to 145 are held in the hold clasp portions 134a of the corresponding hold portions 134.

Thus, in the case where each of the jump wires 141 to 145 are prepared for each section, there is apprehension that the number of component parts will increase and that efficiency of assembly will be worsened.

Therefore, the steps shown in FIG. 14A and FIG. 14B may be adopted.

Firstly, as shown in FIG. 14A, a single string of jump wire 140 is prepared. The jump wire 140 is longer enough than the total length of the jump wires 141 to 145. The jump wire 140 is extended between and on all the hold portions 134, and then laser welding is performed. At this point of time, all the hold portions 134 are connected (conducted) via the jump wire 140.

Subsequently, as shown in FIG. 14B, from the jump wire 140, unnecessary portions (sections) are cut (cut out). As a result, the jump wires 141 to 145 are left.

Through these steps, it is possible to prevent an increase in the number of component parts and to improve the assembly efficiency.

<Other Modifications>

In the aforementioned embodiment, description has been for the case where the 4-pole-3-brush electric motor 2 is adopted. However, the present invention is not limited to this. A 6-pole- or 8-pole-3-brush electric motor 2 may be adopted. In the case of 6 poles, the low speed brush 31a and the common brush 31c are required to be disposed so as to be 60° spaced form each other in mechanical angle while, in the case of 8 poles, they are required to be disposed so as to be 45° spaced from each other in mechanical angle.

Furthermore, in the aforementioned embodiment, description has been for the case where the brush holder stay 33 is formed in an annular shape. However, the present invention is not limited to this. So long as the commutator 23 is insertable therethrough, the brush holder stay 33 may have, for example, a U shape.

Moreover, in the aforementioned embodiment, description has been for the case where the brush holder stay 33 and the connector portion 34 are integrally formed as the holder unit 32. However, the present invention is not limited to this.

Furthermore, in the aforementioned embodiment, description has been for the structure in which the wiper motor 1 of the present invention is used for driving the front wiper. However, the present invention is not limited to this. The wiper motor 1 may be used for driving a rear wiper or the like, or alternatively, may be used as a general motor other than the wiper motor 1.

Otherwise, within a range not departing from the spirit or scope of the present invention, it is appropriately possible to replace the constituent elements of the aforementioned embodiment with well-known constituent elements. Furthermore, the aforementioned modifications may be appropriately combined.

For example, in the aforementioned embodiment, description has been for the case where the color of the whole of the insulator 100 is set to natural color of the resin. However, the present invention is not limited to this. The insulator 100 may be formed so that at least the laser irradiation protrusion portion 101 has natural color. Furthermore, the color of the insulator 100 may be set to black, and the color of the brush holder stay 33 (holder unit 32) may be set to natural color. In this case, the laser beam L is irradiated from the brush holder stay 33 side. Furthermore, the colors of both the insulator 100 and the brush holder stay 33 (holder unit 32) may be set to natural color.

Furthermore, in the aforementioned embodiment, description has been for the case where, with the color of the resin being set to natural color, an easy-to-transmit-heat portion that is good in transmission of heat of the laser beam L (transmittance of the laser beam L) is made. However, the present invention is not limited to this. The easy-to-transmit-heat portion may be made by use of a material that is good in transmission of heat of the laser beam L (transmittance of the laser beam L) and that also has insulating capacity.

BRIEF DESCRIPTION OF THE REFERENCE SYMBOLS

1: wiper motor
2: electric motor
3: rotation shaft
6: armature
23: commutator
31: brush
33: brush holder stay
41: brush holder
100: insulator
102: through-hole 110: noise prevention element
115: lead wire
120: wiring member
130: terminal
130A: first terminal
130B: second terminal
130C: third terminal
131: seat portion
132: protrusion portion
133: through-hole
133a: tapered surface
134: hold portion
134a: hold clasp portion
135: notch
140: jump wire
141 to 145: jump wire
151: holder hole
161: first connection portion
162: second connection portion
231: brush
231s: pigtail
233: brush holder stay
241: brush holder
245: spring member
300: insulator
S1: first surface
S2: second surface
H: distance

The invention claimed is:

1. An electric motor, comprising:
an armature core and a commutator that are fixed to a rotation shaft;
an armature coil that is wound around the armature core;
a brush holder stay that has a first surface and a second surface, which is reverse to the first surface, the first and second surfaces being arranged intersecting with a direction along the rotation shaft;
brushes that are supported on the brush holder stay and that are brought into sliding contact with the commutator;
electrical elements that are electrically connected to the brushes and that filter electrical noise from the brushes; and
a plurality of terminals and a plurality of jump wires that electrically connect between the brushes and the electrical elements,
wherein the brushes and the electrical elements are disposed on the second surface,
a plurality of first connection portions, which connect between the electrical elements and the terminals, and a plurality of second connection portions, which connect between the terminals and the jump wires, are provided,
the brush holder stay has holes between the first surface and the second surface,
each of the terminals has:
a base portion that has a flat-plate-like shape and is in contact with the brush holder stay;
a protrusion portion that is provided on the base portion, at least a part of the protruding portion being arranged in the hole of the brush holder stay,
a hold portion that is provided on the base portion,
a lead wire of the electrical element is inserted through the terminal and through the brush holder stay from the second surface to the first surface,
the lead wire is connected to the protrusion portion of the terminal as the first connection portion,
the jump wire is connected to the hold portion of the terminal as the second connection portion,
both the first connection portions and the second connection portions are located nearer to the first surface than the second surface of the brush holder stay.

2. The electric motor according to claim 1,
wherein the plurality of first connection portions are formed by laser-welding the electrical elements and the terminals, and
wherein the plurality of second connection portions are formed by laser-welding the terminals and the jump wires.

3. The electric motor according to claim 2,
wherein the first connection portion and the second connection portion are arranged at a distance of 4 mm or less in a thickness direction of the brush holder stay.

4. The electric motor according to claim 2,
wherein a dimension between a top portion of the protrusion portion and a root portion of the hold portion is set to 1.5 mm or less.

5. The electric motor according to claim 1,
wherein a surface on a side of the protrusion portion that receives the lead wire is a tapered surface so as to be tapered toward an insertion direction of the lead wire.

6. The electric motor according to claim 1,
wherein the holes hold the terminals while exposing the plurality of first connection portions and the plurality of second connection portions to the first surface, and
wherein the terminals are arranged by being inserted into the holes from a side of the second surface of the brush holder stay.

7. The electric motor according to claim 1, comprising
an insulator that holds the electrical elements and that is also superposedly arranged on the second surface,
wherein between the insulator and the brush holder stay, the terminals are sandwiched.

8. The electric motor according to claim 7,
wherein the electrical elements are arranged on a surface of the insulator that is opposite to the brush holder stay, and also the lead wires of the electrical elements are protruded from a surface of the insulator on the brush holder side, and
wherein when the insulator is superposedly arranged on the second surface, the lead wires of the electrical elements are inserted into through-holes of the terminals.

* * * * *